US012755446B2

(12) United States Patent
Pereira et al.

(10) Patent No.: US 12,755,446 B2
(45) Date of Patent: Oct. 6, 2026

(54) IMAGE SYNTHESIS WITH FEATURE-LEVEL SUPERVISION AND PER-STEP OPTIMIZATION

(71) Applicant: Robert Bosch GmbH, Stuttgart (DE)

(72) Inventors: Marcus A. Pereira, Lubbock, TX (US); Wan-Yi Lin, Wexford, PA (US); Chaithanya Kumar Mummadi, Coraopolis, PA (US); Ru-Yu Wang, Leonberg (DE)

(73) Assignee: Robert Bosch GmbH (DE)

( * ) Notice: Subject to any disclaimer, the term of this patent is extended or adjusted under 35 U.S.C. 154(b) by 107 days.

(21) Appl. No.: 18/974,554

(22) Filed: Dec. 9, 2024

(65) Prior Publication Data

US 2026/0162316 A1 Jun. 11, 2026

(51) Int. Cl.

| | |
|---|---|
| ***G06T 11/00*** | (2026.01) |
| ***G06T 5/60*** | (2024.01) |
| ***G06T 5/70*** | (2024.01) |
| ***G06T 7/00*** | (2017.01) |
| ***G06T 7/11*** | (2017.01) |

(52) U.S. Cl.

CPC ................ *G06T 11/00* (2013.01); *G06T 5/60* (2024.01); *G06T 5/70* (2024.01); *G06T 7/0004* (2013.01); *G06T 7/11* (2017.01); *G06T 2207/20081* (2013.01); *G06T 2207/20084* (2013.01); *G06T 2207/30108* (2013.01); *G06T 2210/12* (2013.01)

(58) Field of Classification Search

CPC ... G06T 11/00; G06T 5/60; G06T 5/70; G06T 7/0004; G06T 7/11; G06T 2207/20081

USPC .......................................................... 345/619

See application file for complete search history.

(56) References Cited

U.S. PATENT DOCUMENTS

| | | | | |
|---|---|---|---|---|
| 2020/0058126 | A1* | 2/2020 | Wang | G16H 30/20 |
| 2023/0067841 | A1* | 3/2023 | Saharia | G06N 3/047 |
| 2023/0360182 | A1* | 11/2023 | Fanello | G06T 5/92 |
| 2024/0135572 | A1* | 4/2024 | Singh | G06T 7/70 |
| 2024/0135613 | A1* | 4/2024 | Ding | G06T 11/60 |

(Continued)

OTHER PUBLICATIONS

Olaf Ronneberger et al., "U-Net: Convolutional Networks for Biomedical Image Segmentation." N. Navab et al. (Eds.): MICCAI 2015, Part III, LNCS 9351, pp. 234-241, 2015.

(Continued)

*Primary Examiner* — David T Welch

(74) *Attorney, Agent, or Firm* — Dickinson Wright PLLC

(57) ABSTRACT

An image synthesis process includes generating a target mask based on a segmentation mask of a defect displayed in a source image. A source feature map is generated based on the source image at each step of a forward diffusion process. A synthetic image is generated via a reverse diffusion process involving steps. Each step includes (i) generating an optimized iterate of a latent representation of a current version of denoising a latent representation of a noisy input image by minimizing an energy function that compares differences between (a) a current feature map generated based on the latent representation of the current version and (b) a target feature map generated using the target mask and the source feature map (ii) predicting a current noise amount of the optimized iterate, and (iii) generating a latent representation of a next version using the current noise amount and the optimized iterate.

20 Claims, 11 Drawing Sheets

(56) References Cited

U.S. PATENT DOCUMENTS

| | | | | |
|---|---|---|---|---|
| 2024/0161468 | A1* | 5/2024 | Li | G06V 10/82 |
| 2024/0169499 | A1* | 5/2024 | Agarwal | G06T 5/77 |
| 2024/0169622 | A1* | 5/2024 | Xie | G06T 11/10 |
| 2024/0169623 | A1* | 5/2024 | Zeng | G06T 11/60 |
| 2024/0320789 | A1* | 9/2024 | Hinz | G06T 11/00 |
| 2024/0320872 | A1* | 9/2024 | Hinz | G06T 11/00 |
| 2024/0320873 | A1* | 9/2024 | Hinz | G06T 11/00 |
| 2024/0331322 | A1* | 10/2024 | Smith | G06T 13/40 |
| 2024/0355022 | A1* | 10/2024 | Shi | G06T 9/00 |
| 2025/0022099 | A1* | 1/2025 | Song | G06T 5/50 |
| 2025/0124544 | A1* | 4/2025 | Park | G06T 5/50 |
| 2025/0166133 | A1* | 5/2025 | Kahatapitiya | G06T 5/60 |
| 2025/0166307 | A1* | 5/2025 | Gadelha | G06T 19/00 |
| 2025/0166367 | A1* | 5/2025 | Dorkenwald | G06V 10/40 |
| 2025/0241512 | A1* | 7/2025 | Huang | G06T 5/50 |
| 2025/0292445 | A1* | 9/2025 | Vembar | G06T 11/00 |
| 2025/0308081 | A1* | 10/2025 | Yuan | G06V 10/26 |
| 2025/0308113 | A1* | 10/2025 | Revanur | G06T 11/10 |
| 2025/0315999 | A1* | 10/2025 | Jiang | G06T 11/60 |
| 2025/0322561 | A1* | 10/2025 | Ungureanu-Contes | G06T 11/10 |
| 2025/0328997 | A1 | 10/2025 | Zhou et al. | |
| 2025/0336043 | A1* | 10/2025 | Vasconcelos | G06T 5/60 |
| 2025/0356540 | A1* | 11/2025 | Djelouah | G06T 11/00 |
| 2026/0017758 | A1* | 1/2026 | Zhang | G06T 5/50 |
| 2026/0030825 | A1* | 1/2026 | Maros | G06T 7/12 |
| 2026/0051087 | A1* | 2/2026 | Kuen | G06T 11/10 |
| 2026/0087603 | A1* | 3/2026 | Kreis | G06T 5/70 |
| 2026/0094404 | A1* | 4/2026 | Feldman | G06V 10/26 |
| 2026/0105670 | A1* | 4/2026 | Wang | G06T 13/20 |
| 2026/0134598 | A1* | 5/2026 | Nadar | G06T 12/20 |

OTHER PUBLICATIONS

Dani Valevski et al., "UniTune: Text-Driven Image Editing by Fine Tuning a Diffusion Model on a Single Image." arXiv:2210.09477v4 [cs.CV] Jul. 5, 2023, 16 Pages.

Jooyoung Choi et al., "Custom-Edit: Text-Guided Image Editing with Customized Diffusion Models." arXiv:2305.15779v1 [cs.CV] May 25, 2023, 11 Pages.

Ron Mokady et al., "Null-text Inversion for Editing Real Images using Guided Diffusion Models." CVPR 2023, pp. 6038-6047.

Chong Mou et al., "Dragondiffusion: Enabling Drag-Style Manipulation on Diffusion Models." arXiv:2307.02421v2 [cs.CV] Nov. 20, 2023, 18 Pages.

Hyungjin Chung et al., "Diffusion Posterior Sampling for General Noisy Inverse Problems." arXiv:2209.14687v4 [stat.ML] May 20, 2024, 30 Pages.

Zhenyu Yan et al., "AnomalySD: Few-Shot Multi-Class Anomaly Detection with Stable Diffusion Model," arXiv:2408.01960v1 [cs. CV] Aug. 4, 2024, 10 Pages.

Jiaqi Liu et al., "Deep Industrial Image Anomaly Detection: A Survey," arXiv:2301,11514v3 [cs.CV May 30, 2023, 49 Pages.

Extended European search report for EP 25217279.6, dated May 4, 2026, 8 Pages.

Robin Rombach et al., "High-Resolution Image Synthesis with Latent Diffusion Models." CVPR 2022, pp. 10684-10695.

Nataniel Ruiz et al. "DreamBooth: Fine Tuning Text-to-Image Diffusion Models for Subject-Driven Generation." CVPR 2023, pp. 22500-22510.

Bahjat Kawar et al., "Imagic: Text-Based Real Image Editing with Diffusion Models." CVPR 2023, pp. 6007-6017.

Ashish Vaswani et al., "Attention Is All You Need." 31st Conference on Neural Information Processing Systems (NIPS 2017), Long Beach, CA, USA, 11 Pages.

Ozan Oktay et al., "Attention U-Net: Learning Where to Look for the Pancreas." arXiv:1804.03999v3 [cs.CV] May 20, 2018, 10 Pages.

Jonathan Ho et al., "Denoising Diffusion Probabilistic Models." 34th Conference on Neural Information Processing Systems (NeurIPS 2020), Vancouver, Canada, 12 Pages.

Prafulla Dhariwal et al., "Diffusion Models Beat GANs on Image Synthesis." 35th Conference on Neural Information Processing Systems (NeurIPS 2021), 15 Pages.

Alex Nichol et al., "Improved Denoising Diffusion Probabilistic Models." Proceedings of the 38 th International Conference on Machine Learning, PMLR 139, 2021, 10 Pages.

Jonathan Ho et al., "Classifier-Free Diffusion Guidance." arXiv:2207.12598v1 [cs.LG] Jul. 26, 2022, 14 Pages.

Jiaming Song et al., "Denoising Diffusion Implicit Models." arXiv:2010.02502v4 [cs.LG] Oct. 5, 2022, 22 Pages.

Konpat Preechakul et al., "Diffusion Autoencoders: Toward a Meaningful and Decodable Representation." CVPR 2022, pp. 10619-10629.

Diederik P. Kingma et al., "Adam: A Method for Stochastic Optimization." arXiv:1412.6980v9 [cs.LG] Jan. 30, 2017, 15 Pages.

Alexander Kirillov et al., "Segment Anything." Proceedings of the IEEE/CVF International Conference on Computer Vision 2023, pp. 4015-4026.

* cited by examiner

INPUT IMAGE 10
WITH BOUNDING BOX 10C

SYNTHETIC IMAGE 30

TARGET MASK 60

COMPLEMENT MASK 70

INPUT IMAGE 10

REFERENCE INPUT IMAGE 50

IMAGE SYNTHESIS WITH FEATURE-LEVEL SUPERVISION AND PER-STEP OPTIMIZATION

TECHNICAL FIELD

This disclosure relates generally to computer vision and anomaly detection, and more particularly to digital image synthesis via a diffusion-based machine learning model with feature-level supervision and per-step optimization.

BACKGROUND

Synthesizing novel defects of manufacturing parts helps to build intelligent and robust machine learning models to detect defects when deployed on-line onto production assembly lines. Pretrained Diffusion models have been shown to synthesize realistic images. However, directly using them to synthesize various defects of specialized manufacturing parts poses challenges due to the specificity and complexity of such items, as well as some proprietary concerns.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to image synthesis. The method includes receiving an input image that displays at least an object. The method includes receiving (i) a source image that displays at least a defect and (ii) a corresponding segmentation mask that includes a first predetermined value for each pixel associated with an image segment of the defect and a second predetermined value for remaining pixels of the segmentation mask. The method includes generating a target mask based on the segmentation mask and a specified modification to the defect. The method includes generating, via a machine learning model, a source feature map based on the source image at each step of a forward diffusion process. The method includes generating a target feature map by multiplying the target mask to a transformed version of the source feature map. The transformed version includes the same specified modification. The target mask and the source feature map having a same particular spatial resolution. The method includes generating, via the forward diffusion process involving the machine learning model, a noisy latent representation of the input image. The forward diffusion process includes a plurality of steps that occur along a first trajectory defined between a latent representation of the input image and the noisy latent representation. The method includes generating, via a reverse diffusion process involving the machine learning model, a new latent representation by denoising the noisy latent representation in the plurality of steps that occur along a second trajectory. The second trajectory is defined between the noisy latent representation and the latent representation of the synthetic image. The plurality of steps perturb the denoising of the noisy latent representation from the first trajectory towards the second trajectory. The plurality of steps include a current step that (i) minimizes an energy function to generate an optimized iterate of a latent representation of a current version of denoising the noisy latent representation, the energy function including a first energy component that compares differences between (a) a current masked feature map that is the target mask multiplied to a current feature map, the current feature map being generated by the machine learning model based on the latent representation of the current version and (b) the target feature map of the current step (ii) predicts, via the machine learning model, a current amount of noise of the optimized iterate, and (iii) generates a latent representation of a next version using the current amount of noise and the optimized iterate. The method includes decoding the new latent representation to generate the synthetic image. The synthetic image displays the object with a new defect. The new defect is a rendition of the defect with the specified modification.

According to at least one aspect, a computer-implemented method relates to image synthesis. The method includes receiving an input image that displays at least an object. The method includes receiving (i) a source image that displays at least a defect and (ii) a corresponding segmentation mask that includes a first predetermined value for each pixel associated with an image segment of the defect and a second predetermined value for remaining pixels. The method includes generating a target mask based on the segmentation mask and a specified modification to the defect. The method includes generating, via a machine learning model, a source feature map based on the source image at each step of a forward diffusion process. The method includes generating a target feature map by multiplying the target mask to a transformed version of the source feature map. The transformed version including the same specified modification. The target mask and the source feature map have a same particular spatial resolution. The method includes generating, via the forward diffusion process involving the machine learning model, a noisy input image based on the input image. The forward diffusion process includes a plurality of steps that occur along a first trajectory defined between the input image and the noisy input image. The method includes generating, via a reverse diffusion process involving the machine learning model, a synthetic image by denoising the noisy input image in the plurality of steps that occur along a second trajectory. The second trajectory is defined between the noisy input image and the synthetic image. The plurality of steps perturb the denoising of the noisy input image from the first trajectory towards the second trajectory. The plurality of steps include a current step that (i) minimizes an energy function to generate an optimized iterate of a current version of denoising the noisy input image, the energy function including a first energy component that compares differences between (a) a current masked feature map that is the target mask multiplied to a current feature map, the current feature map being generated by the machine learning model based on the current version and (b) the target feature map of the current step (ii) predicts, via the machine learning model, a current amount of noise of the optimized iterate, and (iii) generates a next version using the current amount of noise and the optimized iterate. The synthetic image displays the object with a new defect. The new defect is a rendition of the defect with the specified modification.

According to at least one aspect, a computer-implemented method of generating a dataset includes receiving an input image that displays at least an object. The method includes receiving (i) a source image that displays at least a defect and (ii) a corresponding segmentation mask that includes a first predetermined value for each pixel associated with an image segment of the defect and a second predetermined value for remaining pixels of the segmentation mask. The method includes generating a target mask based on the segmentation mask and a specified modification to the defect. The method includes generating, via a machine learning model, a source feature map based on the source image at each step of a forward diffusion process. The method includes generating a target feature map by multiplying the target mask to a transformed version of the source feature map. The transformed version includes the same specified modification. The target mask and the source feature map having a same particular spatial resolution. The method includes generating, via the forward diffusion process involving the machine learning model, a noisy latent representation of the input image. The forward diffusion process includes a plurality of steps. The method includes generating, via a reverse diffusion process involving the machine learning model, a new latent representation by denoising the noisy latent representation in the plurality of steps. The plurality of steps include a current step that (i) minimizes an energy function to generate an optimized iterate of a latent representation of a current version of denoising the noisy latent representation. The energy function includes a first energy component that compares differences between (a) a current masked feature map that is the target mask multiplied to a current feature map, the current feature map generated by the machine learning model based on the latent representation of the current version and (b) the target feature map of the current step (ii) predicting, via the machine learning model, a current amount of noise of the optimized iterate, and (iii) generating a latent representation of a next version using the current amount of noise and the optimized iterate. The method includes decoding the new latent representation to generate the synthetic image. The synthetic image displays the object with a new defect. The new defect is a rendition of the defect with the specified modification. The dataset includes the synthetic image. The dataset is configured for training an image classifier.

According to at least one aspect, a computer-implemented method of generating a dataset includes receiving an input image that displays at least an object. The method includes receiving an input image that displays at least an object. The method includes receiving (i) a source image that displays at least a defect and (ii) a corresponding segmentation mask that includes a first predetermined value for each pixel associated with an image segment of the defect and a second predetermined value for remaining pixels. The method includes generating a target mask based on the segmentation mask and a specified modification to the defect. The method includes generating, via a machine learning model, a source feature map based on the source image at each step of a forward diffusion process. The method includes generating a target feature map by multiplying the target mask to a transformed version of the source feature map. The transformed version including the same specified modification. The target mask and the source feature map have a same particular spatial resolution. The method includes generating, via the forward diffusion process involving the machine learning model, a noisy input image based on the input image. The forward diffusion process includes a plurality of steps. The method includes generating, via a reverse diffusion process involving the machine learning model, a synthetic image by denoising the noisy input image in the plurality of steps. The plurality of steps include a current step that (i) minimizes an energy function to generate an optimized iterate of a current version of denoising the noisy input image, the energy function including a first energy component that compares differences between (a) a current masked feature map that is the target mask multiplied to a current feature map, the current feature map being generated by the machine learning model based on the current version and (b) the target feature map of the current step (ii) predicts, via the machine learning model, a current amount of noise of the optimized iterate, and (iii) generates a next version using the current amount of noise and the optimized iterate. The synthetic image displays the object with a new defect. The new defect is a rendition of the defect with the specified modification. The synthetic image displays the object with a new defect. The new defect is a rendition of the defect with the specified modification. The dataset includes the synthetic image. The dataset is configured for training an image classifier.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

Figure 1:
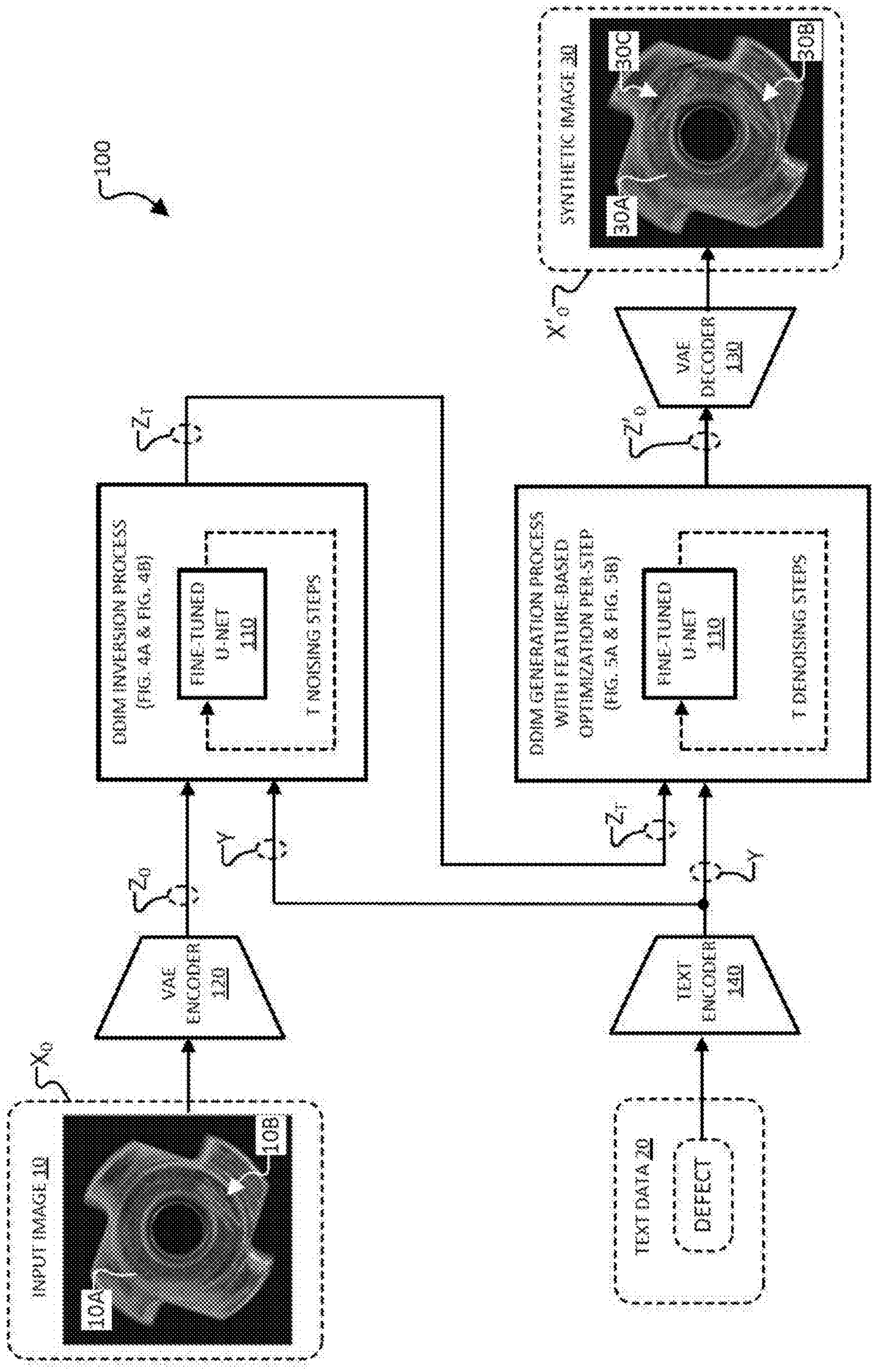
FIG. 1 is a flow diagram that provides an overview of an example of an image synthesis process via a machine learning model according to at least one example embodiment of this disclosure.

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Recent advances in deep learning have opened new possibilities for image synthesis and image editing. However, there has been little exploration into applying these technologies for the synthesis of specific defects at specified locations of digital images relating to some fields (e.g., manufacturing field, medical field, etc.). In particular, the challenge remains in accurately capturing defect patterns from one image and transferring them onto objects in digital images while maintaining realism and precision in the new image.

As an example, in the field of manufacturing, ensuring the quality of produced parts is crucial to maintaining operational efficiency and product reliability. Defects in manufactured parts can lead to significant losses, both in terms of material wastage and time spent in manual inspection and correction. This also has serious implications for the safe usage of the manufactured goods and the reputation of the company. Traditional methods of identifying and simulating defects in manufacturing processes often rely on either manual inspection or machine vision systems that are limited by their ability to synthesize or transfer specific defect characteristics from one part to another. These limitations make it challenging to fully test the robustness of manufacturing systems and processes against a wide variety of defect types.

This disclosure provides a technical solution for synthesizing novel defects in digital images to build intelligent and robust machine learning models to distinguish between defect and non-defect image samples. For example, this disclosure includes embodiments that enable machine learning models to synthesize specific defects (e.g., scratches, discolorations, dents, protrusions, etc.) for a given application (e.g., manufacturing, medical imaging, etc.) with a high degree of control while eliminating the need for very complex and technical text inputs from an expert. The embodiments provide an effective and efficient way to synthesize novel defects in digital images with a high degree of controllability. Moreover, this image synthesis approach generates realistic synthetic images, thereby reducing the data imbalance that may found in some fields, (e.g., manufacturing field, medical field, etc.), where there are limited image samples due to, for example, particular privacy and confidentiality concerns. Specifically, the embodiments provide a novel approach to image synthesis via feature-level energy optimization using machine learning models, such as Text-to-Image Diffusion Model or a Text-to-Image Latent Diffusion Model.

FIG. 1 is a flow diagram, which provides an overview of an image synthesis process along with a non-limiting examples of input data and output data. As shown in FIG. 1, at this instance, the image synthesis process generates a synthetic image 30 with a synthesized defect (referred to as new defect 30C) upon receiving at least an input image 10 and text data 20. The synthetic image 30 is generated via a finetuned machine learning model using the input image 10. In FIG. 1, the finetuned machine learning model is a finetuned Text-to-Image Latent Diffusion Model 100 that operates in the latent space. In other examples, the finetuned machine learning is a finetuned Text-to Image Diffusion Model (i.e., the finetuned U-Net 110 and the text encoder 140) that operates in the image space. The synthetic image 30 displays at least one new defect 30C, which is not displayed in the input image 10.

Referring to FIG. 1, the image synthesis process uses a finetuned Text-to-Image Latent Diffusion Model 100, which comprises (i) a variational autoencoder (VAE) including a VAE encoder 120 and a VAE decoder 130, (ii) a text encoder 140, and (iii) a latent diffusion model, such as finetuned U-Net 110. The image synthesis process includes at least a Denoising Diffusion Implicit Model (DDIM) inversion process (FIGS. 4A and 4B) and a DDIM generation process (FIG. 5A and FIG. 5B). The DDIM inversion process includes a number (denoted as T) of noising steps using the finetuned U-Net 110. In addition, the DDIM generation process includes a same number (denoted as) of denoising steps using the finetuned U-Net 110.

As shown in FIG. 1, the image synthesis process generates a synthetic image 30, which resembles the input image 10 with a new defect 30C at a specified location. More specifically, the VAE encoder 120 receives the input image 10 as input. The VAE encoder 120 generates a latent representation of the input image 10 as output using the input image 10. Next, a DDIM inversion process is performed on the latent representation of the input image 10. The DDIM inversion process includes a number, T, of noising steps to generate a noisy image (e.g., Gaussian noise image) based on the input image 10. The DDIM inversion process uses the finetuned U-Net 110 at each step to predict an amount of noise that is present in a latent representation of a current version of the noising of the input image 10 at timestep t. After completing T noising steps (in a forward direction from t=1 to t=T), the DDIM inversion process generates a latent representation, $z_T$, of the input image 10.

The DDIM generation process receives the latent representation, $z_T$, and text embedding, $\gamma$, of the text data 20 (e.g., a textual description such as "defect"). In this non-limiting example, the text data 20 relates to or is indicative of a defect. The text encoder 140 generates text embedding from text data 20, which is indicative of a defect or anomaly. The DDIM generation process includes a number (denoted as T) of denoising steps to generate a synthetic image 30 (e.g., new image that displays the input image with the new defect at the specified location) based on the latent representation, $z_T$. The DDIM generation process uses the finetuned U-Net 110 at each step to predict an amount of noise that is present in a latent representation of a current version of the denoising at timestep t. After performing T denoising steps in a reverse direction from t=T to t=1, the DDIM generation process generates a latent representation, $\acute{z}_0$, of the synthetic image $\acute{x}_0$. The VAE decoder 130 generates the synthetic image $\acute{x}_0$ by decoding this latent representation, $\acute{z}_0$. As shown in FIG. 1, the synthetic image 30 is not a mere reconstruction of the input image 10. Rather, the synthetic image 30 displays the input image 10 with a new defect 30C at the desired location of the input image. Specifically, as shown in FIG. 1, the synthetic image 30 displays an object 30A (corresponding to object 10A of the input image 10), the defect 30B (corresponding to defect 10B of the input image 10), and the new defect 30C.

Figure 2A:
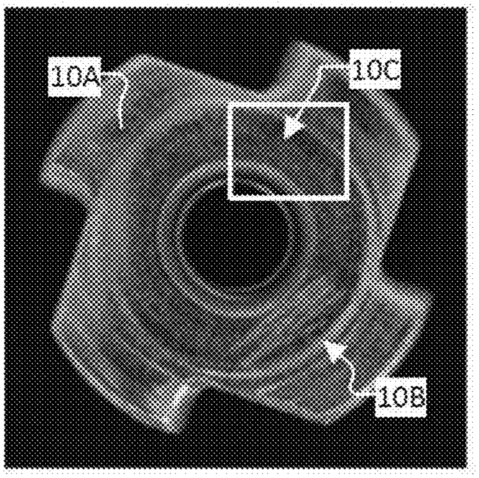
FIG. 2A and FIG. 2B illustrate enlarged views of the non-limiting examples of the digital images of FIG. 1 according to at least one example embodiment of this disclosure.
Figure 2B:
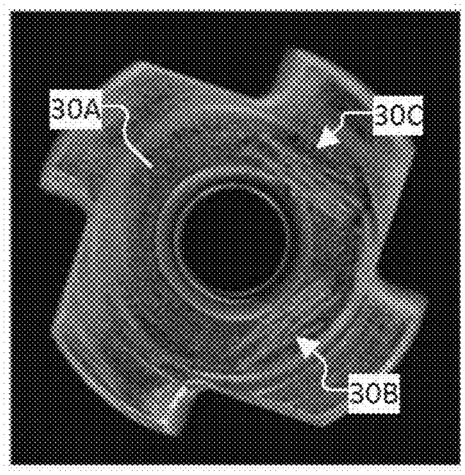

FIG. 2A and FIG. 2B illustrate enlarged views of the non-limiting examples of the digital images (e.g., input image 10 and synthetic image 30) of FIG. 1. In particular, FIG. 2A illustrates a digital image, which is the input to the Text-To-Image Latent Diffusion Model 100 and which displays an object 10A with a defect 10B. In this example, the object 10A is a metal nut and the defect 10B is a scratch. In this digital image, the scratch is displayed on a lower right portion of the nut (or a lower right portion of the digital image). Also, the digital image includes a bounding box 10C, which specifies a desired location (or a target region) for generating a new defect. In this case, the bounding box 10C is located at a top right portion of the nut (or a top right portion of the digital image).

Figure 7A:
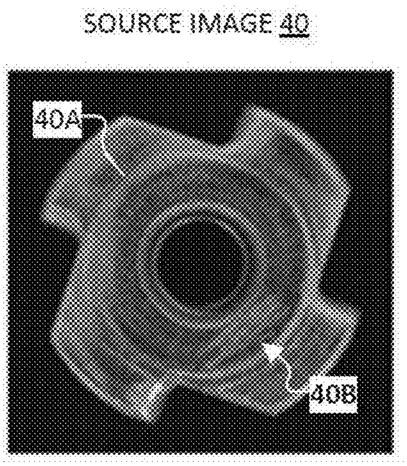
FIG. 7A illustrates an example of a source image according to at least one example embodiment of this disclosure.

FIG. 2B illustrates a digital image, which is the output that is generated, via the finetuned Text-To-Image Latent Diffusion Model 100, based on the input image 10. Specifically, the Text-To-Image Latent Diffusion Model 100 generates a synthetic image 30 as the output image. As shown in FIG. 2B, the synthetic image 30 displays the input image 10 (e.g., object 10A and defect 10B) with a new defect 30C. That is, the synthetic image 30 displays the object 30A (corresponding to object 10A of the input image 10), the defect 30B (corresponding to defect 10B of the input image 10), and the new defect 30C. The new defect 30C is displayed with the desired transformation at the desired location, as specified by the bounding box 10C. In this case, the synthetic image 30 displays the new defect 30C within the region, which corresponds to the bounding box 10C of the input image. Also, in FIG. 1, the new defect 30C is generated with the desired transformation (e.g. a vertically displaced and vertically flipped version of the defect of the source image), which is specified by the user in advance. The specified transformation includes a set of transformations. The set of transformations may include one or more affine transformations (e.g., displacement, rotation, resizing, flipping, shearing, etc.). In the examples shown in FIG. 2A and FIG. 2B, the finetuned Text-To-Image Latent Diffusion Model 100 is advantageous in being configured to generate the synthetic image 30, which includes at least one new defect 30C that has realistic appearance for being based on an actual, real defect taken from a source image 40 (FIG. 7A). Upon being generated, these synthetic images 30 may be used as anomalous data samples for training another machine learning model such as an image classifier (e.g., classifier 1114 of FIG. 11) to detect anomalies and/or defects in digital images within a production system such as Automated Optical Inspection (AOI) system.

As aforementioned, the Text-To-Image Latent Diffusion Model may include three main components that are configured to interact with one another. The first component is a text encoder 140, which receives text-based data sample as an input, and, when executed, proceeds to convert the text-based data sample into an embedding, as indicated by text embedding 316. For example, the text encoder 140 is an encoder of a large language model (LLM), a text encoder of Contrastive Language-Image Pre-training (CLIP), or any suitable text encoding technology. The second component is the VAE, in which the VAE encoder 120 receives image-based data sample 302 and generates a latent space representation 308, $z_0$, of the image, and the VAE decoder 130 receives a latent space representation, $\acute{z}_0$, and generates the synthetic image 30, $\acute{x}_0$. The third component is a convolutional neural network 318 (e.g., U-Net 110), which receives a noisy latent space representation 312 from noise model 310, along with text embedding 316, and predicts an amount of noise of the noisy latent space representation.

Also, the Text-To-Image Latent Diffusion Model 100 falls within the latent diffusion model class, as convolutional neural network 318 is configured to work within a latent space. In other embodiments, however, a Text-To-Image Diffusion Model may be used such that entirety of the process of FIG. 1 remains within the image space. In such embodiments, the input image 10 is provided directly to noise model 310 without passing through the VAE encoder 120, and a noisy version of the input image 10 is then provided to convolutional neural network 318. Similarly, the output of convolutional neural network 318 is then used to directly generate the synthetic image 30 after the DDIM Generation Process, rather than passing through the VAE decoder.

Figure 3:
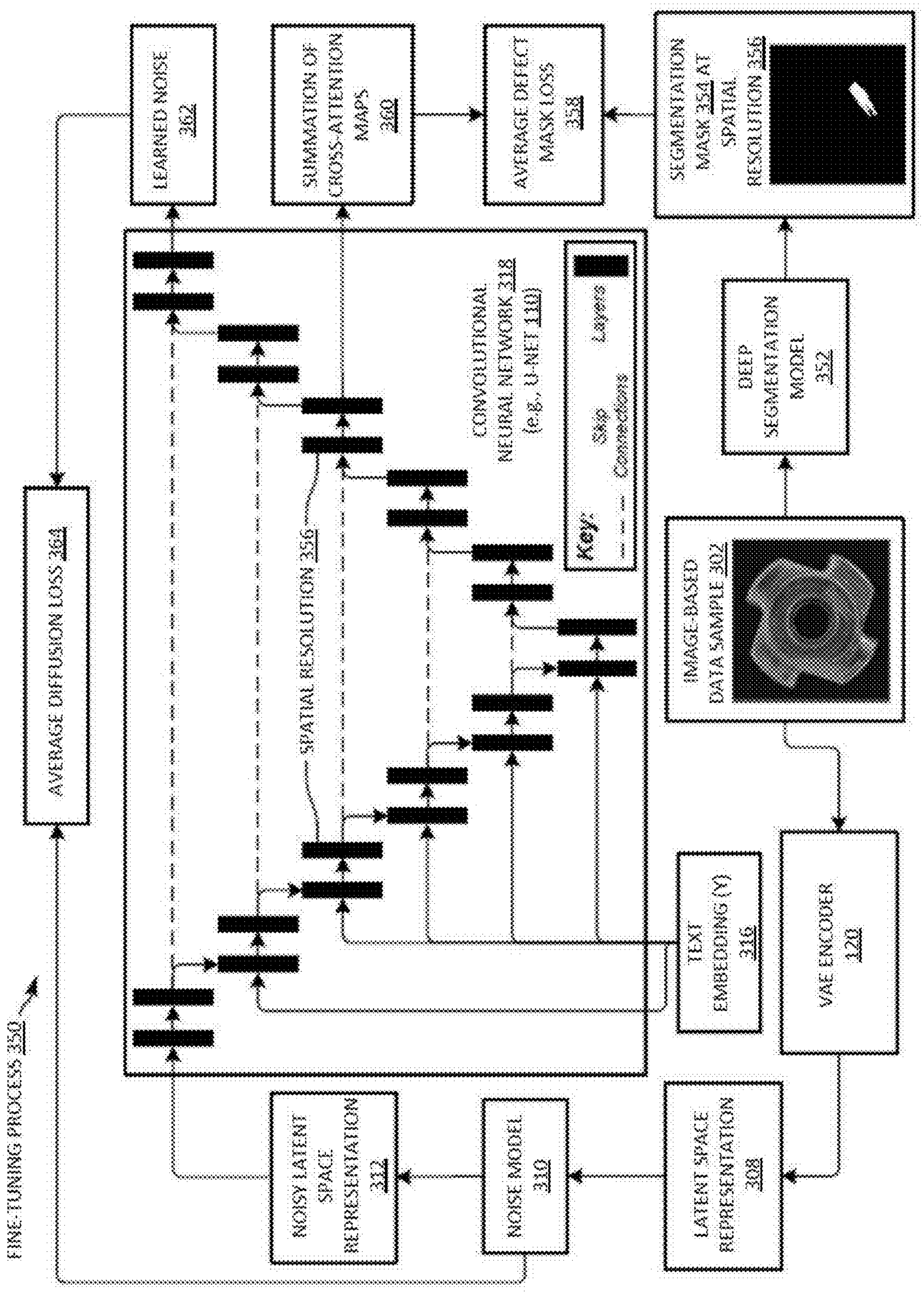
FIG. 3 illustrates an example of a process for finetuning a U-Net of FIG. 1 according to at least one embodiment of this disclosure.
Figure 6:
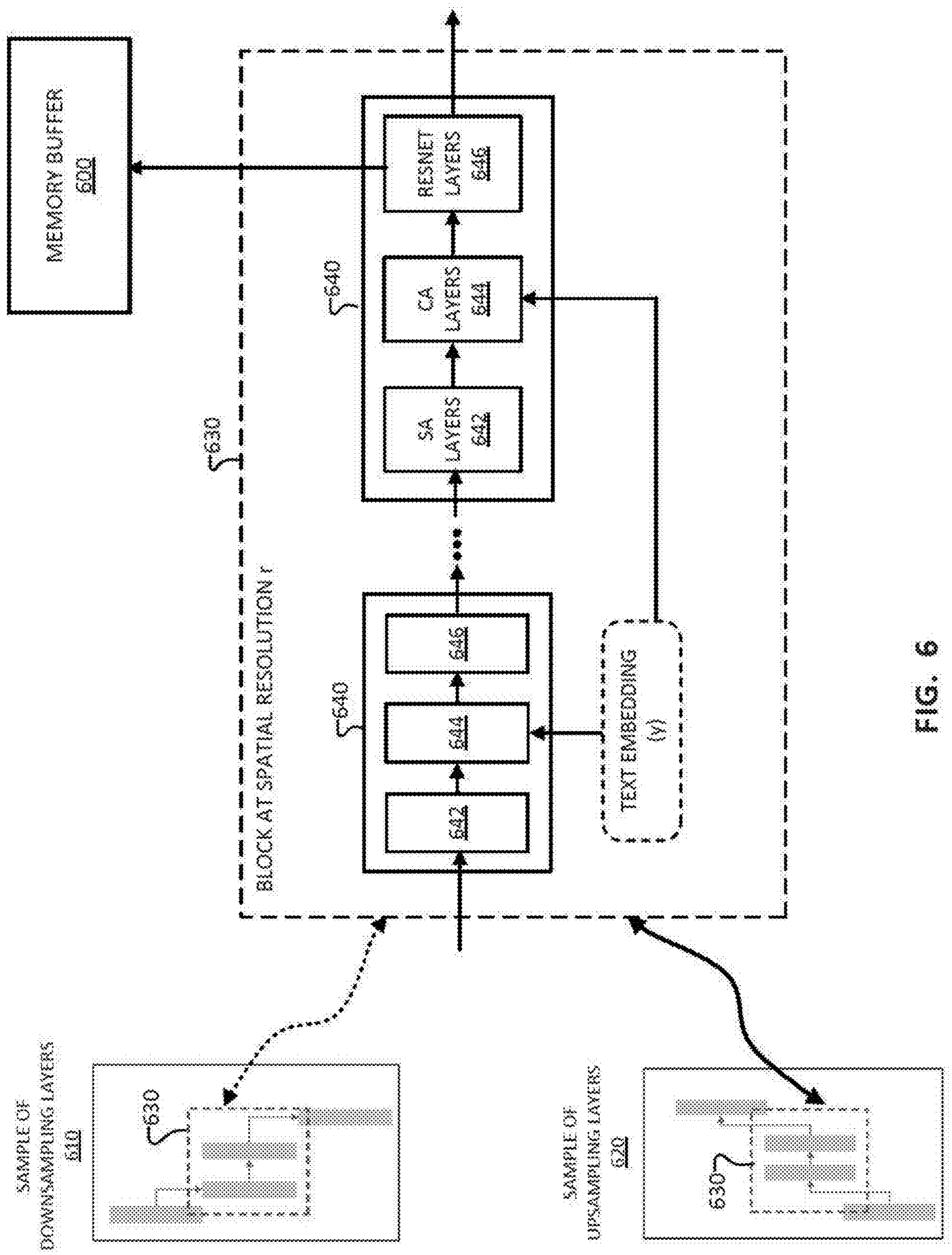
FIG. 6 illustrates aspects of an architecture of the U-Net with respect to the ResNet layers, where the feature maps are extracted for the DDIM generation process of FIG. 5B, according to at least one example embodiment of this disclosure.

Moreover, a Text-To-Image Latent Diffusion Model, such as those described herein within the context of defect detection, may include at least a LLM text encoder, a variational autoencoder, and a convolutional neural network. The convolutional neural network may be configured to have a U-Net architecture. As such, and as related to the description herein, a "convolutional" neural network that is configured to have a U-Net architecture may be defined as having convolutional neural network layers, self-attention layers, cross-attention layers, and Residual Neural Network (ResNet) layers that are layered on top of one another and in between an input layer and an output layer of the model. These layers are shown in FIG. 3 and FIG. 6. Additional embodiments pertaining to such types of machine learning models are described herein with regard to Text-to-Image Latent Diffusion Model 100 and convolutional neural network 318.

Embodiments illustrated in the following FIG. 3 continue to describe convolutional neural network 318 as being implemented with the Text-To-Image Latent Diffusion Model 100. However, it should be understood that a similar fine-tuning process of convolutional neural network 318 may be performed for embodiments in which convolutional neural network 318 is implemented such that the Text-To-Image Diffusion Model remains in the image space, rather than converting into the latent space.

FIG. 3 illustrates a process for fine-tuning a convolutional neural network (e.g., the U-Net architecture of the Stable Diffusion model) within the Text-To-Image Latent Diffusion Model 100 introduced in FIG. 1, according to some embodiments. At a moment in time depicted by FIG. 3, it should be understood that convolutional neural network 318 refers to a pre-trained model that is now undergoing fine-tuning via the methods described herein. The model is referred to as a "pre-trained" model because the model has already undergone one or more rounds of training using various training datasets, and thus is at a point at which it may be used for generalized tasks. The moment in time depicted in FIG. 3 thus refers to "fine-tuning" the pre-trained convolutional neural network 318 of Text-To-Image Latent Diffusion Model 100 in order to enable the learning of detecting defects within images of manufactured products. The "pre-trained" Text-To-Image Latent Diffusion Model has yet to be trained for such a specialized task, and therefore the architecture shown in FIG. 3 and the corresponding processes described herein pertain to fine-tuning the model such that it may then be executed for such types of specialized tasks (e.g., detecting a portion of an image that contains a defect, scratch, mark, or other quality issue).

The following paragraphs describe the four process flows that collectively define fine-tuning process 350 and that are configured to operate using the U-Net architecture shown in FIG. 3. The paragraphs are formatted in a way as to discuss sequential steps that are taken in order to execute a pre-trained, convolutional neural network 318 of Text-To-Image Latent Diffusion Model 100 for fine-tuning such that the model learns to detect portion(s) of an image that refer to a defect of a manufactured product. The first process flow refers to blocks 302, 120, 308, 310, 312, 20, 140, and 316 of FIG. 3. The second process flow refers to blocks 318, 316, 312, and 362 of FIG. 3. The third process flow refers to blocks 310, 362, and 364 of FIG. 3. The fourth process flow refers to blocks 302, 352, 356, 358, and 360 of FIG. 3.

Referring now to the first process flow, inputs to the convolutional neural network 318 of Text-To-Image Latent Diffusion Model 100 include both a noisy latent space representation 312 and embedded text 316. As introduced in FIG. 1, image-based data sample 302 is provided to VAE encoder 120 in order to compress the image into latent space representation 308. Latent space representation 308 is then provided to noise model 310 to output a noisy latent space representation 312, prior to providing said sample to the convolutional neural network 318. As also introduced in FIG. 1, text-based data sample is provided to an LLM text encoder 140, such as the CLIP encoder, to output embedded text 316.

As shown in FIG. 3, image-based data sample 302 resembles a manufactured product (e.g., a nut) with a defect (e.g., a scratch) on the surface of the bottom right-hand side of the image. As the present disclosure pertains to detecting defects within a manufacturing setting, the image-based data sample may resemble an image of a product that was captured while the product was still within a manufacturing facility and that has completed the manufacturing process, but has not yet left the production facility (e.g., to be sold or transported elsewhere). In some embodiments, the captured image may correspond to a moment in time at which a quality check of manufactured products is being made in an assembly line setting.

The particular image-based data sample shown in FIG. 3 is a manufactured product that resembles a nut. However, it should be understood that images of other manufactured products are also meant to be encompassed in the discussion herein. In some embodiments, the image may resemble a bolt or a screw, or some other mechanical product component. In such embodiments, the image may include a scratch, dent, defect, or other physical quality issue with a portion of the overall manufactured product. In other embodiments, the image may resemble a portion of a larger manufactured product. For example, the image may capture a hood of a car that is being manufactured within a car manufacturing facility, and the image may further include a portion of the hood of the car that has a dent or scratch.

The text-based data sample, as also shown in FIG. 1, includes some short word, phrase, or sentence that provides a description for image-based data sample 302. For example, the text-based data sample that corresponds to image-based data sample 302 could contain the word "defect," the phrase "nut with scratch," or a sentence "The image is manufactured product X with a mark on the right." It should be understood that any other short word or phrase that provides initial information to the convolutional neural network 318, indicating that image-based data sample 302 contains a manufacturing defect, could equally be used as text-based data sample, including words and phrases such as "scratch," "dent," "defect," "discoloration," "warping," "bent," "quality check failure," etc.

Returning now to the four process flows that collectively define fine-tuning process 350, the first process flow is illustrated using blocks 302, 308, 310, and 312, and refers to a preparation of a noisy latent space representation 312 that is then used as an input to the convolutional neural network 318. In order to fine-tune convolutional neural network 318 to learn to detect defects within image-based data samples, initial latent space representation 308 is provided to a noise model 310, which, when executed, adds stochastic noise to the latent space representation of image-based data sample 302 to output noisy latent space representation 312. In some embodiments, the noise model is configured to have a pre-determined noise schedule that depends on the time step t that gradually lowers the signal-to-noise ratio of the original image-based data sample 302. As additionally described below, the added noise is then used during the execution of the convolutional neural network 318 in order to learn to predict the noise (see also learned noise 362, additionally described below).

The second process flow of the four process flows refers to blocks 318, 316, 312, and 362 of FIG. 3, and refers more specifically to an execution of the convolutional neural network 318. In some embodiments, the noisy latent space representation 312 and the embedded text 316 are provided to convolutional neural network 318, as indicated by the arrows in FIG. 3, and then the model is then executed to predict noise within noisy latent space representation 312 using a plurality of cross-attention maps at different spatial resolutions within the U-Net architecture of convolutional neural network 318. Cross-attention maps may be defined herein as the output or activation of a cross-attention block within the U-Net architecture of the convolutional neural network of the Text-To-Image Latent Diffusion Model 100.

In some embodiments, the execution of the Text-to-Image Diffusion Model or the Text-to-Image Latent Diffusion Model includes a forward process and a reverse process. During the forward process, Gaussian noise is gradually added to the noisy latent space representation to destroy any structure in the image-based data sample and eventually convert the information within the original image-based data sample into Gaussian noise. During the reverse process, the convolutional neural network is trained to gradually remove the noise that has been added to the image-based data sample in the forward process, as indicated via learned noise 362 in FIG. 3. With respect to both the forward and the reverse processes, "gradually" refers to the processes as being auto-regressive and including a large number of steps and/or iterations. Once a given training and/or fine-tuning execution of convolutional neural network 318 is complete, the model is thus able to generate image-based data samples, such as synthetic image 30, using the reverse diffusion process.

In some embodiments, Text-To-Image Latent Diffusion Model 100 leverages an LLM text encoder 140 that has been trained on vast amounts of publicly available internet text data in order to "guide" the generation process of the convolutional neural network 318 of Text-To-Image Latent Diffusion Model 100. The "guidance" of the model may in part be configured by modifying the reverse process of the model, in which the reverse process is perturbed at each step by small amounts to influence the overall evolution and thus output of the reverse process. The modification may be computed using conditional guidance, classifier guidance, or classifier-free guidance. For example, a Text-To-Image Latent Diffusion Model 100 may be configured such that conditional guidance is used, and thus the reverse, or generation, process is "conditioned" on the text-based data sample, such as text data 20 (e.g., the word "defect").

Furthermore, and again by leveraging Large Language Models, a pre-trained Large Language Model is executed to convert the text-based data sample into a list of tokens, which are then further processed into embedding vectors as one vector for each token. The embedding vectors are then incorporated into the diffusion generation process using cross-attention blocks, as shown in FIG. 3. The cross-attention blocks use an attention mechanism to ensure that the different portions of the noisy latent space representation 312 are correctly influenced by the most relevant parts of the embedded text 316. In some embodiments, the U-Net architecture may be used to configure this connection between the cross-attention blocks and the respective inputs to Text-To-Image Latent Diffusion Model 100.

Moreover, the U-Net architecture may additionally be mathematically represented by (i)

$$\epsilon_t^\theta = DM(t, x_t, y),$$

where DM refers to Text-to-Image Diffusion Model, or (ii)

$$\epsilon_t^\theta = LDM(t, z_t, y),$$

where LDM refers to Text-to-Image Latent Diffusion Model, and in both cases, y, is the text embedding fed to the U-Net 110 and θ are the trainable weights of the U-Net 110. The U-Net 110 is used at every step t of the reverse process to predict the amount of noise present in the current iterate of the generation process, e.g., wherein $$\epsilon_t^\theta$$

is the predicted amount of noise in $x_t$ or $z_t$ at step t. The conditional text guidance may therefore be written as y, wherein y is the same for respective steps t of the generation process. The reverse process may include a number of steps t corresponding to a number within a range of 1000-4000 in order to generate high quality data, according to some embodiments. In order to prevent the reverse, or generation, process from becoming computationally expensive or slow, the following modifications may be further made to the architecture of convolutional neural network 318 of Text-To-Image Latent Diffusion Model 100.

In some embodiments, "samplers" may be applied for diffusion models, wherein such a configuration causes the reverse process to become faster while not significantly compromising the quality of generated data. For example, a Denoising Diffusion Implicit Model (DDIM) sampler modifies the forward process such that it is non-Markovian, thus enabling for a modified reverse process with significantly few steps. In some embodiments, the DDIM generation sampler is computed via equation 1, wherein θ collectively represents the weights of the entire Text-to-Image Diffusion Model, which includes the U-Net 110 and the VAE encoder 120. In other embodiments involving the Text-to-Image Latent Diffusion Model 100, the DDIM sampler may be written as equation 2.

$$x_{t-1} = \sqrt{\alpha_{t-1}}\left(\frac{x_t - \sqrt{1-\alpha_t}\,\epsilon_t^\theta(t, x_t, y)}{\sqrt{\alpha_t}}\right) + \sqrt{1-\alpha_{t-1}}\,\epsilon_t^\theta(t, x_t, y) \quad [1]$$

$$z_{t-1} = \sqrt{\alpha_{t-1}}\left(\frac{z_t - \sqrt{1-\alpha_t}\,\epsilon_t^\theta(t, z_t, y)}{\sqrt{\alpha_t}}\right) + \sqrt{1-\alpha_{t-1}}\,\epsilon_t^\theta(t, z_t, y) \quad [2]$$

Since the DDIM sampler is deterministic and does not involve addition of noise at each step t, one can use DDIM to encode data into a DDIM-latent-code or DDIM-latent noise vector. Here DDIM-latent-code is used to explicitly distinguish from VAE-latent code. Specifically, the DDIM-latent-code can then be used as a starting point of a reverse, or generation, process to generate (i) a reconstruction of the original input image, when there is no feature-level energy optimization 510, or (ii) a synthetic image when there is feature-level energy optimization 510 on a step-wise basis. This is referred to as DDIM-Inversion and is achieved by applying the equation 3 or equation 4, over a fixed number of steps.

$$x_{t+1} = \sqrt{\alpha_{t+1}}\left(\frac{x_t - \sqrt{1-\alpha_t}\,\epsilon_t^\theta(t, x_t, y)}{\sqrt{\alpha_t}}\right) + \sqrt{1-\alpha_{t+1}}\,\epsilon_t^\theta(t, x_t, y) \quad [3]$$

$$z_{t+1} = \sqrt{\alpha_{t+1}}\left(\frac{x_t - \sqrt{1-\alpha_t}\,\epsilon_t^\theta(t, z_t, y)}{\sqrt{\alpha_t}}\right) + \sqrt{1-\alpha_{t+1}}\,\epsilon_t^\theta(t, z_t, y) \quad [4]$$

Returning now to the four process flows that are illustrated in FIG. 3, the third and fourth process flows pertain to the computation of an average diffusion loss parameter 364 and an average defect mask loss parameter 358, which are then used to update weights of the convolutional neural network 318 of Text-To-Image Latent Diffusion Model 100.

The third process flow of the overall fine-tuning process 350 refers to blocks 310, 362, and 364. As shown in FIG. 3, the amount of noise that is applied during the execution of noise model 310 may be compared to the learned noise 362 that is learned during the fine-tuning execution of convolutional neural network 318 in order to compute an average diffusion loss parameter 364 of the model.

The fourth process flow of the overall fine-tuning process 350 refers to blocks 302, 352, 356, 358, and 360 of FIG. 3. In order to compute an average defect mask loss parameter 358, a segmentation mask 354 that corresponds to image-based data sample 302 is first generated. In some embodiments, the image-based data sample 302 is provided to a deep segmentation model 352, and the deep segmentation model 352 is then executed to output a segmentation mask 354. For example, the deep segmentation model 352 is Segment Anything Model (SAM) or any applicable segmentation technology.

In some embodiments, segmentation mask 354 may resemble a binary image in which a subset of the pixels of image-based data sample 302 that correspond specifically to the defect of the manufactured product have a pixel magnitude of 255, while other pixels of the binary image have a pixel magnitude of zero. As illustrated in FIG. 3, the defect in the bottom right-hand portion of segmentation mask 354 has a pixel magnitude of 255 while the rest of the image has a pixel magnitude of zero.

Continuing with description of the fourth process flow of the overall fine-tuning process 350, a summation of cross-attention maps 360 at a given spatial resolution 356 is also used to compute the average defect mask loss parameter 358. In some embodiments, and prior to the execution of fine-tuning process 350, a user may determine which spatial resolution of the six spatial resolutions shown in FIG. 3 is to be used when computing the average defect mask loss parameter 358. Such an indication of which particular spatial resolution is to be used may then be provided to the computing devices that are used to execute the Text-To-Image Latent Diffusion Model 100 and compute said parameter 358, as cross-attention maps 360 and segmentation mask 354 refer to the same spatial resolution 356 in order to make such a computation of the average defect mask loss parameter 358. The selected spatial resolution may typically be one-eighth or one-sixteenth of the spatial resolution of the original image-based data sample 302. In particular embodiments (e.g. FIG. 3), the spatial resolution 356 refers to a 64×64 resolution. As shown in FIG. 3, the summation of cross-attention maps 360 at a given spatial resolution 356 and the segmentation mask 354 at spatial resolution 356 of the image-based data sample 302 are then used to compute the average defect mask loss parameter 358.

Following the computation of both the average diffusion loss parameter 364 and the average defect mask loss parameter 358, a fifth process flow of fine-tuning process 350 may also be understood from FIG. 3 in which the parameters are both used to update weights of the convolutional neural network 318 of Text-To-Image Latent Diffusion Model 100. In order to update weights of the model, the average diffusion loss parameter 364 and the average defect mask loss parameter 358 are summed together to determine a total loss parameter of the convolutional neural network 318 of Text-To-Image Latent Diffusion Model 100. The total loss parameter is then optimized using any variant of stochastic gradient descent, such as by applying the Adam optimizer. The optimized total loss parameter is then used when updating one or more of the weights of the convolutional neural network 318 of Text-To-Image Latent Diffusion Model 100. After one or more of the weights have been updated for a plurality of iterations of Adam, the fine-tuned convolutional neural network 318 of Text-To-Image Latent Diffusion Model 100 is used to generate a synthetic image 30, as shown, for example, in FIG. 1.

Figure 4A:
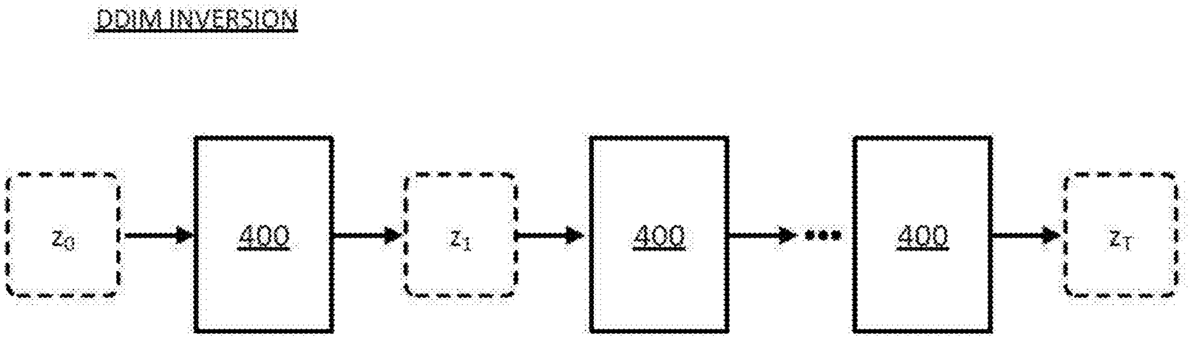
FIG. 4A is a flow diagram that provides an overview of the DDIM inversion process of FIG. 1 according to at least one example embodiment of this disclosure.
Figure 5A:
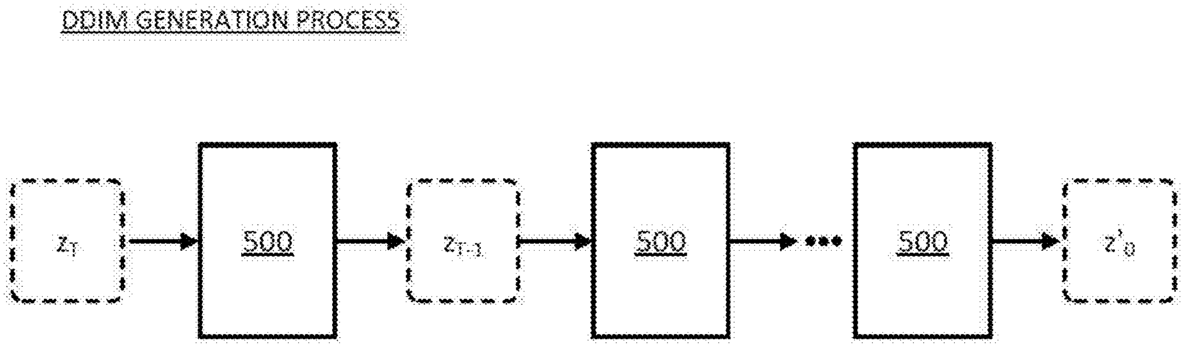
FIG. 5A is a flow diagram that provides an overview of the DDIM generation process of FIG. 1 according to at least one example embodiment of this disclosure.
Figure 5B:
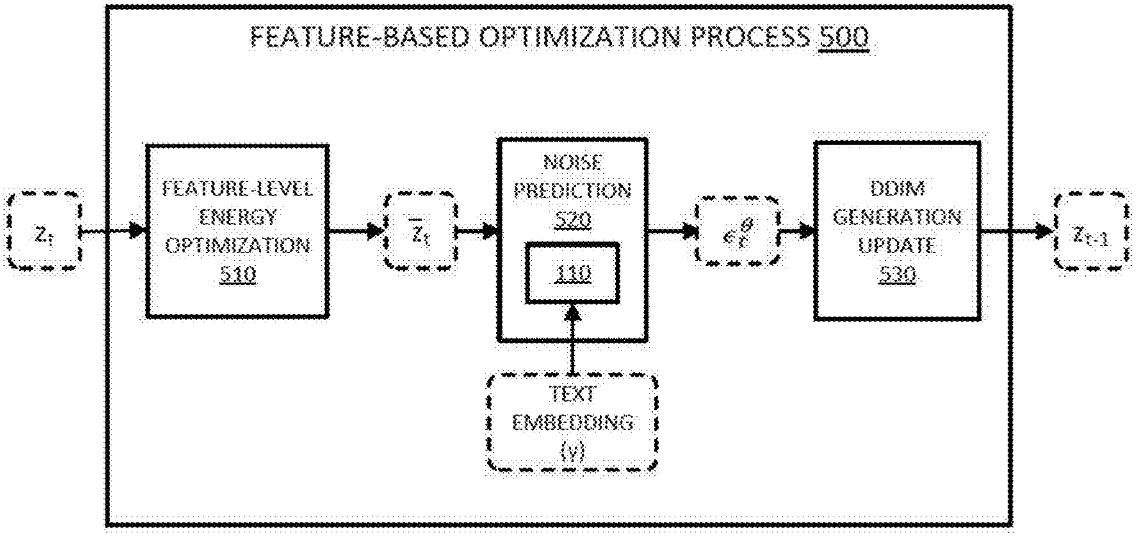
FIG. 5B illustrates aspects of the feature-based optimization process of FIG. 5A according to at least one example embodiment of this disclosure.

FIG. 4A is a flow diagram that provides an overview of the DDIM inversion process. Specifically, FIG. 4A illustrates that the DDIM inversion process involves a number of steps, where T represents an integer number greater than zero. The DDIM inversion process is a forward diffusion process such that the DDIM inversion process advances from timestep t=1 to timestep t=T. Also, as shown in FIG. 4A, the DDIM inversion process includes the noise diffusion process 400 at each timestep.

Figure 4B:
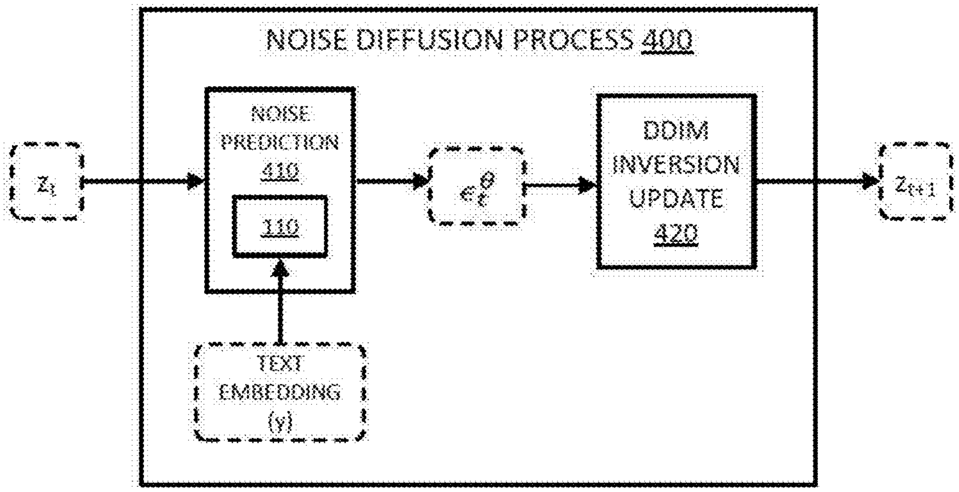
FIG. 4B illustrates aspects of the noise diffusion process that is performed at each step of the DDIM inversion process of FIG. 4A according to at least one example embodiment of this disclosure.

FIG. 4B illustrates aspects of the noise diffusion process 400, which is performed at each step of the forward diffusion process. Specifically, the noise diffusion process 400 advances the DDIM inversion process from one timestep (e.g., t) to a next timestep (t+1) in the forward diffusion process. For example, the noise diffusion process 400 receives input data (e.g., a latent representation of a current version of a noising of the input data 10) at timestep t and generates output data (e.g., a latent representation of a next version of a noising of the input data 10) at timestep t+1. Next, the noise diffusion process 400 receives input data at timestep t+1 and generates output data at timestep t+2. This process continues until the noise diffusion process 400 receives input data at timestep T−1 and generates output data at timestep T.

As discussed, the noise diffusion process 400 is performed at each step of the DDIM inversion process. The noise diffusion process 400 includes a noise prediction phase 410 and a DDIM inversion update phase 420. However, the noise diffusion process 400 is not limited to those phases shown in FIG. 4 but may include a different number of phases than that shown in FIG. 4 provided that the same functions and/or objectives are achieved.

At the noise prediction phase 410, according to an example, the noise diffusion process 400 includes predicting a noise amount, $$\epsilon_t^\theta(t, z_t, y),$$

within a latent representation, $z_t$, at timestep t. The noise prediction phase 410 uses the U-Net 110 to generate the noise amount, $$\epsilon_t^\theta(t, z_t, y),$$

as output in response to receiving timestep t, latent representation of a current version, $z_t$ and text embedding, y, as input.

At the DDIM inversion update phase 420, according to an example, the noise diffusion process 400 includes performing a DDIM inversion update via equation 4 to generate a latent representation $z_{t+1}$ at timestep t+1 based on the noise prediction, $$\epsilon_t^\theta,$$

and a latent representation, $z_t$. After the DDIM inversion update phase 420, the noise diffusion process 400 continues to proceed to another loop of noise prediction phase 410 and DDIM inversion update phase 420, as shown in FIG. 1 and FIG. 4A, to advance the DDIM inversion process from one timestep (e.g., t) to a next timestep, t+1, in the forward diffusion process for each t until t=T. At t=T−1, the DDIM inversion update phase 420 uses equation 4 to generate the latent representation, $z_T$ which then terminates the DDIM Inversion process.

FIG. 5A is a flow diagram that provides an overview of the DDIM generation process of FIG. 1. Specifically, FIG. 5A illustrates that the DDIM generation process involves a number of steps, where T represents an integer number greater than zero. In this example, the DDIM generation process includes the same number, T, of timesteps as the DDIM inversion process. However, in contrast to the DDIM inversion process, the DDIM generation process is a reverse diffusion process such that the DDIM generation process advances from timestep t=T to timestep t=1. For example, when a latent diffusion model is used, then the DDIM generation process uses and processes a current denoised version of the latent representation, $z_t$, of the noisy latent $z_T$ at a current timestep t. Alternatively, when a diffusion model is used, then the DDIM generation process uses and processes a current denoised version, $x_t$, of the noisy image, $x_T$, at a current timestep t. Also, as shown in FIG. 5A, the DDIM generation process includes the feature-based optimization process 500 at each timestep.

FIG. 5B illustrates aspects of the feature-based optimization process 500 of FIG. 5A according to an example embodiment. Specifically, the feature-based optimization process 500 advances the DDIM generation process from one timestep (e.g., t) to a next timestep (e.g., t−1) in the reverse diffusion process. For example, the feature-based optimization process 500 receives input data (e.g., latent representation $z_t$) at timestep T and generates output data at timestep T−1. Next, the feature-based optimization process 500 receives input data at timestep T−1 and generates output data at timestep T−2. This process continues until the feature-based optimization process 500 receives input data at timestep t=1 and generates output data at timestep t=0. At timestep t=1, the feature-based optimization process outputs the latent representation, $\hat{z}_0$ which is given to the VAE decoder 130 to output the synthetic image 30, $\hat{x}_0$.

As discussed, the feature-based optimization process 500 is performed at each step of the DDIM generation process. Specifically, the feature-based optimization process 500 includes a feature-based energy optimization phase 510, a noise prediction phase 520, and a DDIM generation update phase 530. However, the feature-based optimization process 500 is not limited to those phases shown in FIG. 5 but may include a different number of phases than that shown in FIG. 5 provided that the same functions and/or objectives are achieved.

At the feature-level energy optimization phase 510, according to an example, the feature-based optimization process 500 includes performing feature-level energy optimization of the input data. The feature-level energy optimization phase 510 is iterative. Specifically, for each current timestep t, the feature-level energy optimization phase 510 includes a number (denoted as N) of iterations, where the first iteration starts at n=1 and the last iteration ends at n=N. In this example, N may be received as input or preset. Prior to beginning the first iteration at n=1, the feature-level energy optimization phase 510 includes initializing $$z_t^o = z_t$$

for per-step optimization. Here the name "per-step" refers to the characteristic of the method wherein the N-iteration optimization is performed for every step t of the generation process 500. Each iteration includes (i) computing the energy function, $\varepsilon_{feature}$, using the current iterate, $$z_t^{n-1},$$

and (ii) updating to a next iterate, $$z_t^n,$$

by optimizing the gradient of the energy function using the current iterate, $$z_t^{n-1}.$$

As an example, the next iterate, $$z_t^n,$$

is updated using the Adam optimization algorithm, as set forth in TABLE 1. Upon generating the next iterate, then feature-level energy optimization phase 510 updates the value of n by one and proceeds to perform a next iteration using this next iterate. This feature-based energy optimization continues for each iteration until n=N. When the current iteration is n=N, then the feature-level energy optimization phase 510 considers this update to the final iterate, $$z_t^N,$$

as being the optimized iterate that minimizes the energy function, $\varepsilon_{feature}$. At n=N, the feature-level energy optimization phase 510 sets $$\bar{z}_t = z_t^N,$$

where $\bar{z}_t$ represents the optimized iterate.

At the noise prediction phase 520, according to an example, the feature-based optimization process 500 includes generating a noise prediction, $$\epsilon_t^\theta,$$

using $\bar{z}_t$, which is the optimized iterate of the latent representation, $z_t$, at timestep t of denoising the noisy latent, $z_T$. The noise prediction phase 520 uses the U-Net 110 to generate the noise prediction, $$\epsilon_t^\theta(t, \bar{z}_t, y),$$

as output in response to receiving timestep t, optimized iterate $\bar{z}_t$, and text embedding y.

At the DDIM generation update phase 530, according to an example, the feature-based optimization process 500 includes performing a DDIM generation update to generate a latent representation, $z_{t-1}$, of a next version using equation 2.

After the DDIM generation update phase 530, the feature-based optimization process 500 continues to proceed to another loop of the feature-level energy optimization phase 510, the noise prediction phase 520, and the DDIM generation update phase 530 to advance the DDIM generation process from one timestep (e.g., t) to a next timestep (t−1) in the reverse diffusion process for each t until t=1. At t=1, the DDIM update phase 530 generates the completely denoised latent which is denoted as $\acute{z}_0$, and which is computed as $\acute{z}_0$=DDIM ($\acute{z}_1$, 1, 0, $\epsilon_\theta(1, \bar{z}_1, y)$). This is then converted into a synthetic image 30 using the VAE decoder 130.

In addition, for convenience of reviewing the DDIM generation process of FIG. 5A and FIG. 5B, TABLE 1 includes the pseudocode.

TABLE 1

| Pseudocode for Image Synthesis via DDIM generation process |
|---|
| I. From t = T to t = 1: |
| 1. Initialize $z_t^{n=0} = z_t$ for per-step optimization |
| 2. Optimize the latent at the current time step t: For n = 1 to N: |
| a. Compute the total energy function, $\mathcal{E}_{feature}$, using the current iterate $z_t^{n-1}$ |
| b. Update the iterate $z_t^n = Adam\left(z_t^{n-1}, \nabla_{z_t^{n-1}} \mathcal{E}_{feature}\right)$ |
| 3. Set $\bar{z}_t$ at the current time step $t$ to be the final (i.e., optimized) iterate $z_t^N$ |
| 4. Perform one step of the DDIM update $z_{t-1}$ = DDIM ($\bar{z}_t$, t, t − 1, $\epsilon_t^\theta(t, \bar{z}_t, y)$) |
| II. Output the synthetic image, $\acute{z}_0$, which is generated via the final DDIM update and which is computed via $\acute{z}_0 = DDIM\left(\bar{z}_1, 1, 0, \epsilon_1^\theta(1, \bar{z}_1, y)\right)$ |

As discussed above, the DDIM generation process includes the feature-level energy optimization phase 510 to perform feature-based per-step optimization. The feature-level energy optimization phase 510 optimizes the total feature-based energy function, $\varepsilon_{feature}$, using the current iterate $$z_t^{n-1}.$$

Specifically, the total feature-based energy function, $\varepsilon_{feature}$, is computed via equation 5 when the input image 10 is different from the source image 40. In equation 5, the total feature-based energy function, $\varepsilon_{feature}$ is a sum of a first energy component, $\varepsilon_{new\text{-}defect}$, and a second energy component, $\varepsilon_{consistency}$. Alternatively, the energy function is computed via equation 6 when the source image 40 is also used as the input image 10. In equation 6, the total feature-based energy function, $\varepsilon_{feature}$ is a sum of a first energy component, $\varepsilon_{new\text{-}defect}$, a second energy component, $\varepsilon_{consistency}$, and a third energy component, $\varepsilon_{old\text{-}defect}$. The energy optimization phase 510 is feature-based in that the energy function is evaluated using feature maps, which are extracted from ResNet layers (i.e., residual blocks within a Residual Neural Network) of the U-Net 110.

$$\mathcal{E}_{feature} = \mathcal{E}_{new-defect} + \mathcal{E}_{consistency} \quad [5]$$

$$\mathcal{E}_{feature} = \mathcal{E}_{new-defect} + \mathcal{E}_{consistency} + \mathcal{E}_{old-defect} \quad [6]$$

FIG. 6 illustrates aspects of an architecture of the fine-tuned U-Net 110 with respect to the ResNet layers 646, where the feature maps are extracted for the DDIM inversion and generation processes. In general, the architecture of the U-Net includes downsampling layers, a middle layer, and upsampling layers, as shown in FIG. 3. As the input is processed by the U-Net 110, the downsampling layers convert the original input into tensors that have lower spatial resolution but higher channel count. For example, if the input image had a size of (64, 64, 3) which translates to 64×64 pixels (i.e., the spatial resolution) and 3 channels of red, green, and blue (RGB), then in case of a U-Net with three downsampling layers, each layer will serially act upon the input and produce tensors of size (32, 32, 256), (16, 16, 512) and (8, 8, 1024). In this regard, the spatial resolution is halved with every downsampling layer while the channel count doubles after the 1st downsampling layer. This is performed to extract features of increasing levels of abstraction. The upsampling layers reverse the process of the downsampling layers so that the output of the U-Net 110 has the same spatial and channel resolution as the input to the U-Net 110.

Specifically, FIG. 6 shows an enlarged view of a block 630 of intermediate layers 640 associated with a specific spatial resolution, denoted as r. At the spatial resolution of r, the block 630 may represent a sample of downsampling layers 610 or a sample of upsampling layers 620. In this regard, the architecture of the intermediate layers 640 is the same or similar for a sample of downsampling layers 610 and a sample of the upsampling layers 620. As shown in FIG. 6, each intermediate layer 640 includes self-attention (SA) layers 642, cross-attention (CA) layers 644, and ResNet layers 646. The SA layers 642 generate attention scores to determine how much importance each element of the input image is relative to other elements of the input image. The CA layers 644 generate attention scores to determine how much importance each element of the image is relative to the text embedding. The ResNet layers 646 focus on learning the “residual,” such as the difference between the input and output of a set of layers. In this regard, the ResNet layers 646 generate feature maps based on the input image. More precisely, the ResNet feature maps are extracted from intermediate layers 640 of the U-Net $$(\epsilon_t^\theta)$$

architecture. The core feature of the ResNet layer is the Skip connection, which adds the input of a layer to the output of subsequent layers so that information flows though the network.

Different channels in these ResNet feature maps capture different kinds of information about the contents of the input image. For instance, there could be a channel that learns to detect and extract edges or other sharply changing features in the input image. Thus, ResNet feature maps contain richer information as compared to the raw pixels of the input RGB image ($x_0$). In some embodiments, the ResNet feature maps from the upsampling layers are utilized during the image synthesis process at least since the ResNet feature maps from the upsampling layers were found to produce the best results. Additionally or alternatively to extracting and utilizing the ResNet feature maps from the upsampling layers, the ResNet feature maps from the downsampling layers may be extracted and utilized. Specifically, in this particular example, during DDIM Inversion, the ResNet feature maps from the upsampling layers of the U-Net 110 are stored in a memory buffer 600 for each spatial resolution, as shown by solid arrow in FIG. 6. These ResNet feature maps are later retrieved or extracted from the memory buffer 600 so that they can be used in the feature-level energy optimization phase 510. Also, ResNet feature maps are stored in the memory buffer 600 at every timestep, t, of the DDIM Inversion process.

Furthermore, out of all feature-map tensor entries, only certain specific feature-maps encode or capture the desired attributes. Therefore, in order to produce optimal perturbations in the DDIM generation process, the feature-based energy function is defined based on specific feature-map tensor entries that produce the desired edits/manipulation while leaving all other feature-maps unchanged. Specifically, the feature-based optimization process 500 requires masks to zero-out entries that are not essential with respect to the desired edits/manipulation. The training dataset contains the binary mask image, which can be utilized for the purpose of masking-out these non-essential entries. However, before applying the source segmentation mask 42 (e.g., a binary mask image) to a feature map (e.g., ResNet feature map), the source segmentation mask 42 needs to be resized to the same predetermined resolution of each stored feature map in the memory buffer 600. Non-limiting examples of corresponding source segmentation masks 42 (e.g., binary mask images) of various resolutions are shown in FIG. 8A, FIG. 8B, FIG. 8C, and FIG. 8D.

With feature-based energy optimization 500, the appropriately sized binary mask is multiplied by all of the channels of the stored feature-maps of the same resolution. This overlaying operation zeros-out all of those feature-map entries that are not associated with the defect or the transformed defect after applying the specified transformation ($\mathcal{T}$) to the source segmentation mask 42 (e.g., FIG. 7B). The specified transformation ($\mathcal{T}$) may include a set of affine transformations (e.g., one or more affine transformations). In order to produce a manipulated defect with the feature-based approach, the transformation ($\mathcal{T}$) is only required to be applied to the binary mask image and the feature map. The transformation does not need to be applied directly to extracted raw pixels of the source image. As such, there is no need to crop-out the defect from the source image in feature-based energy optimization.

The feature-based optimization process 500 utilizes energy functions, where each energy function focuses on different aspects of the desired edit/manipulation. An energy function may sometimes be referred to as an energy component when used as part of $\varepsilon_{feature}$. For example, the first energy function, $\varepsilon_{new\text{-}defect}$, is focused on producing the new defect 30C (which is a vertically-flipped and vertically-displaced version of the source defect 40B). Mathematically, $\varepsilon_{new\text{-}defect}$ is defined by equation 7, where, $$\zeta_{t,r}^{o}$$

is the ResNet feature-map at resolution r obtained by passing $x_t$ or $z_t$ through the U-Net 110 to generate $$\epsilon_t^\theta = DM(t, x_t, y) \text{ or}$$

$$\epsilon_t^\theta = LDM(t, z_t, y),$$

respectively, where $$\tilde{\zeta}_{t,r}^{o}$$

is the corresponding ResNet feature-map that was stored in the memory buffer 600 during the DDIM Inversion process. For both terms, the superscript "o" stands for "overlayed," which denotes that these feature maps have been overlayed with a version of the source segmentation mask (e.g., binary mask image) along with any specified transformations of the appropriate resolution, r, thereby zeroing-out the non-essential entries.

$$\varepsilon_{new\text{-}defect} = \sum_{r=1}^{R} \left(\zeta_{t,r}^{o} - \tilde{\zeta}_{t,r}^{o}\right)^2 \quad [7]$$

The second energy function, $\varepsilon_{consistency}$, is similar to as $\varepsilon_{new\text{-}defect}$. However, the overlay is the Logical NOT of the source segmentation mask 42 (e.g., binary mask image), which includes any specified transformations and which is resized to a spatial resolution r that matches the resolution of the stored ResNet feature maps of the memory buffer 600. In other words, the second energy function uses a complement mask, which is a logical complement of the source segmentation mask. The second energy function, $\varepsilon_{consistency}$, performs the computations using the stored feature-maps instead of raw-pixels of the input image. $\varepsilon_{consistency}$ is defined by equation 8.

$$\varepsilon_{consistency} = \left(\zeta_t^{o} - \zeta_{target}^{o}\right)^2) \quad [8]$$

The third energy function, $\varepsilon_{old\text{-}defect}$, is focused on ensuring that the defect of the source image 40 remains unchanged when a source image 40 is used as the input image 10. This third component is applicable for those cases wherein the source defect 40B must remain unchanged while a new defect 30C is added to the input image 10. The mathematical form of the third energy function is exactly the same as that for the first energy function, $\varepsilon_{new\text{-}defect}$, with the only change being the mask image that is used. For $\varepsilon_{old\text{-}defect}$, the source segmentation mask 42 (e.g., the binary mask image) without any transformations ($\mathcal{T}$) is used and resized to the resolution r of the corresponding ResNet feature map. $\varepsilon_{old\text{-}defect}$ is defined by equation 9.

$$\varepsilon_{old-defect} = \sum_{r=1}^{R} \left(\zeta_{t,r}^{o} - \tilde{\zeta}_{t,r}^{o}\right)^2 \quad [9]$$

Figure 7B:
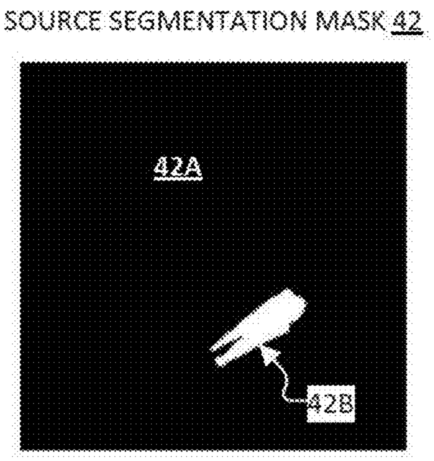
FIG. 7B illustrate an example of a source segmentation mask according to at least one example embodiment of this disclosure.

FIG. 7A and FIG. 7B are digital images, which are taken from a training dataset (e.g., finetuning dataset of FIG. 3) and which are non-limiting examples that relate specifically to the image synthesis example shown in FIG. 1. In this example, FIG. 7A is a real image (i.e., non-synthetic image), which is captured by an image sensor or camera. This real image may be referred to as a source image 40. In this non-limiting example, the source image 40 displays a real object 40A (e.g., nut) with a real defect 40B (e.g., scratch) The real defect 40B is used as a basis for generating the new defect 30C.

Meanwhile, FIG. 7B illustrates a source segmentation mask 42 corresponding to the source image 40. The source segmentation mask 42 is a binary mask image, where each pixel relating to an image segment of the defect 42B is assigned a predetermined value and where remaining pixels 42A are assigned another predetermined value. For example, as shown in FIG. 7B, the source segmentation mask 42 displays the image segment of the defect 42B as white pixels (i.e. pixel magnitude of 255) and the remaining pixels 42A as black pixels (i.e., pixel magnitude of 0). Also, as an example, the source segmentation mask 42 may assign a value of 1 to each pixel associated with the image segment of the defect 42B and a value of zero to each of the remaining pixels 42A. As such, when the source segmentation mask 42 is overlayed on (i.e., multiplied to) another digital image (e.g., feature map), the source segmentation mask 42 is configured to zero out or mask non-relevant portions of the feature map and focus on the image segment of the defect 42B. For example, when the segmentation mask 42 is a binary image that is multiplied to the source image 40, then each pixel relating to the image segment of the defect 40B is displayed while all other remaining pixels are masked (or their pixel values are zeroed-out).

The source image 40 and its corresponding source segmentation mask 42 are used in the DDIM generation process to generate the synthetic image 30 of FIG. 1. In this case, as shown in FIG. 1 and FIG. 7A, the source image 40 may also be used as the input image so that the DDIM generation process generates a synthetic image 30, which displays the new defect 30C in relation to the source image 40. Alternatively, if another image is used as the input image 10, then the DDIM generation process is configured to generate a synthetic image 30, which displays the new defect in relation to another image.

Figure 8A:
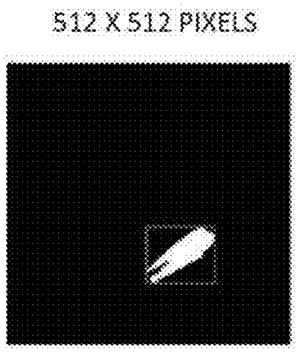
FIG. 8A, FIG. 8B, FIG. 8C, and FIG. 8D illustrate examples of the source segmentation mask at various spatial resolutions, which are used in the DDIM generation process of FIG. 5B, according to at least one example embodiment of this disclosure.
Figure 8B:
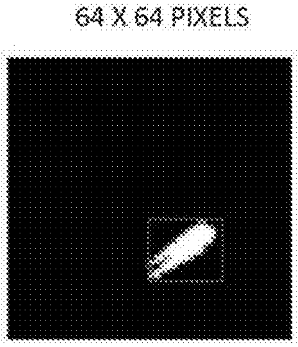
Figure 8C:
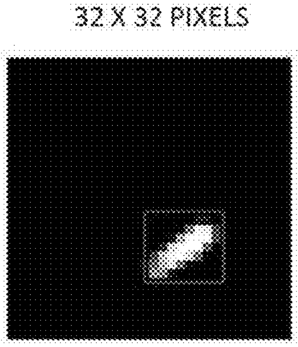
Figure 8D:
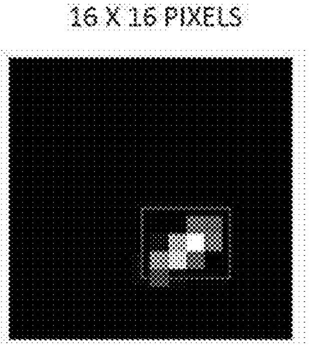

FIG. 8A, FIG. 8B, FIG. 8C, and FIG. 8D are examples of the source segmentation masks 42 (e.g., binary mask images) at different spatial resolutions. Specifically, FIG. 8A illustrates an example of a source segmentation mask 42 (e.g., binary mask image) that has a spatial resolution of 512×512 pixels. The source binary mask image of 512×512 pixels is used to generate a set of binary mask images that have spatial resolutions, which match the spatial resolutions of the feature maps. For example, the set of source binary mask images may be generated by performing resizing operations on the source segmentation mask 42 (FIG. 8A). These resizing operations may include a downsampling operation that is performed by image processing software. As non-limiting examples, FIG. 8B, FIG. 8C, and FIG. 8D illustrate different resized binary mask images. Specifically, FIG. 8B illustrates an example of a binary mask image, which has a spatial resolution of 64×64 pixels. FIG. 8C illustrates an example of a binary mask image, which has a spatial resolution of 32×32 pixels. FIG. 8D illustrates an example of a binary mask image, which has a spatial resolution of 16×16 pixels. In this regard, the source binary mask image is used to generate a set of resized source binary mask images, where a spatial resolution of each resized source binary mask image is lower than a spatial resolution of the source mask image.

Figure 9A:
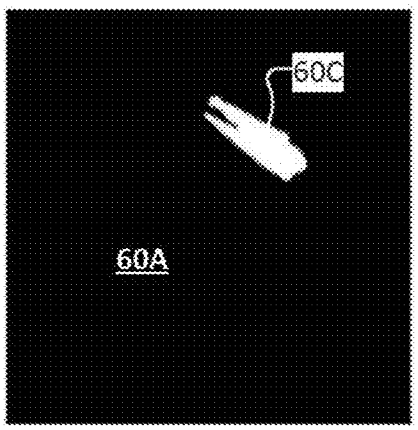
FIG. 9A illustrates an example of a target mask according to at least one example embodiment of this disclosure.

FIG. 9A illustrates a non-limiting example of a target mask 60, which is used during the image synthesis process of FIG. 1 to generate the synthetic image 30. As shown in FIG. 9A, the target mask 60 is a segmentation mask, such as a binary mask image. The target mask 60 includes a first predetermined value (e.g. pixel magnitude of 255) assigned to each pixel of an image segment 60C and a second predetermined value assigned (e.g. pixel magnitude of zero) to each of the remaining pixels 60A. More specifically, in this example, the target mask 60 is a transformed version of the source segmentation mask 42 in which the source segmentation mask 42 is transformed according to a set of transformations, as specified by the user. In this case, the target mask 60 is the source segmentation mask 42 with a vertical flip and a vertical displacement. As shown in FIG. 2A, FIG. 2B, and FIG. 9A, this target mask 60 is utilized to focus the generation of the new defect 30C at the desired location, which is specified, for example, by a user in advance.

Figure 9B:
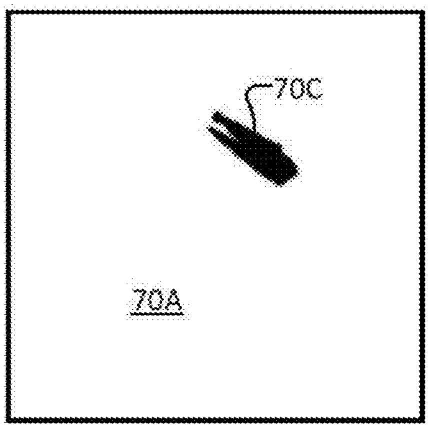
FIG. 9B illustrates an example of a complement mask of FIG. 9A according to at least one example embodiment of this disclosure.

FIG. 9B illustrates a non-limiting example of a complement mask 70, which is used during the image synthesis process of FIG. 1 to generate the synthetic image 30. As shown in FIG. 9B, the complement mask 70 is a logical complement (e.g., logical NOT operation) of the target mask 60 (FIG. 9A). Specifically, in this example, the complement mask 70 assigns a predetermined value (e.g., zero) to each pixel associated with the image segment 70C corresponding to the new defect and another predetermined value (e.g., pixel magnitude of 255) to remaining pixels 70A. As aforementioned, the complement mask 70 is configured to mask the image segment associated with the new defect 30C, thereby ensuring that the remaining portions are consistent with the input image 10 when generating the synthetic image 30 during the DDIM generation process.

Figure 9C:
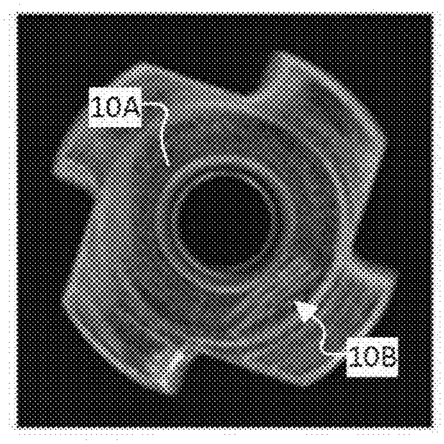
FIG. 9C and FIG. 9D illustrate an example of an input image and an example of a reference input image, respectively, according to at least one example embodiment of this disclosure.
Figure 9D:
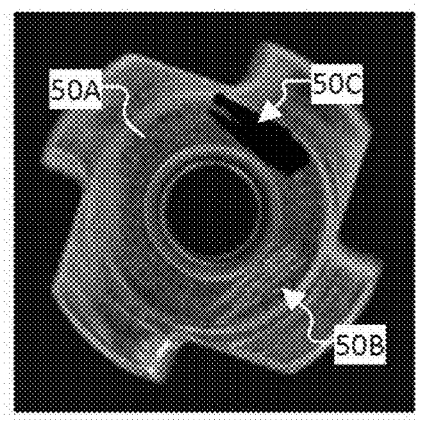

FIG. 9C and FIG. 9D are examples of the input image 10 and the reference input image 50, respectively. In particular, FIG. 9C shows the input image 10 as a visual comparison to the reference input image 50 of FIG. 9D. The reference input image 50, $$x_{target}^{o},$$

is generated by overlaying a transformed version of the complement mask, on the input image 10. The complement mask is a logical complement (i.e., logical NOT) of the source segmentation mask 42 along with any transformations applied. As shown in FIG. 9D, by masking the pixels associated with a rendering of the new defect 30C via assigning a predetermined value of zero those pixels, the reference input image 50 displays the remaining pixels (i.e., the pixels that do not correspond to the image segment of the defect) of the input image 10 and thus serves a reference for how these remaining pixels should appear in the synthetic image 30. In this regard, as shown in FIG. 9D, the reference input image 50 displays the object 50A (corresponding to real object 10A) and the defect 50B (corresponding to real defect 10B). That is, the reference input image 50 is configured to serve as a reference that ensures that the remaining pixels remain consistent and not changed from the input image 10 during the DDIM generation process.

Figure 10:
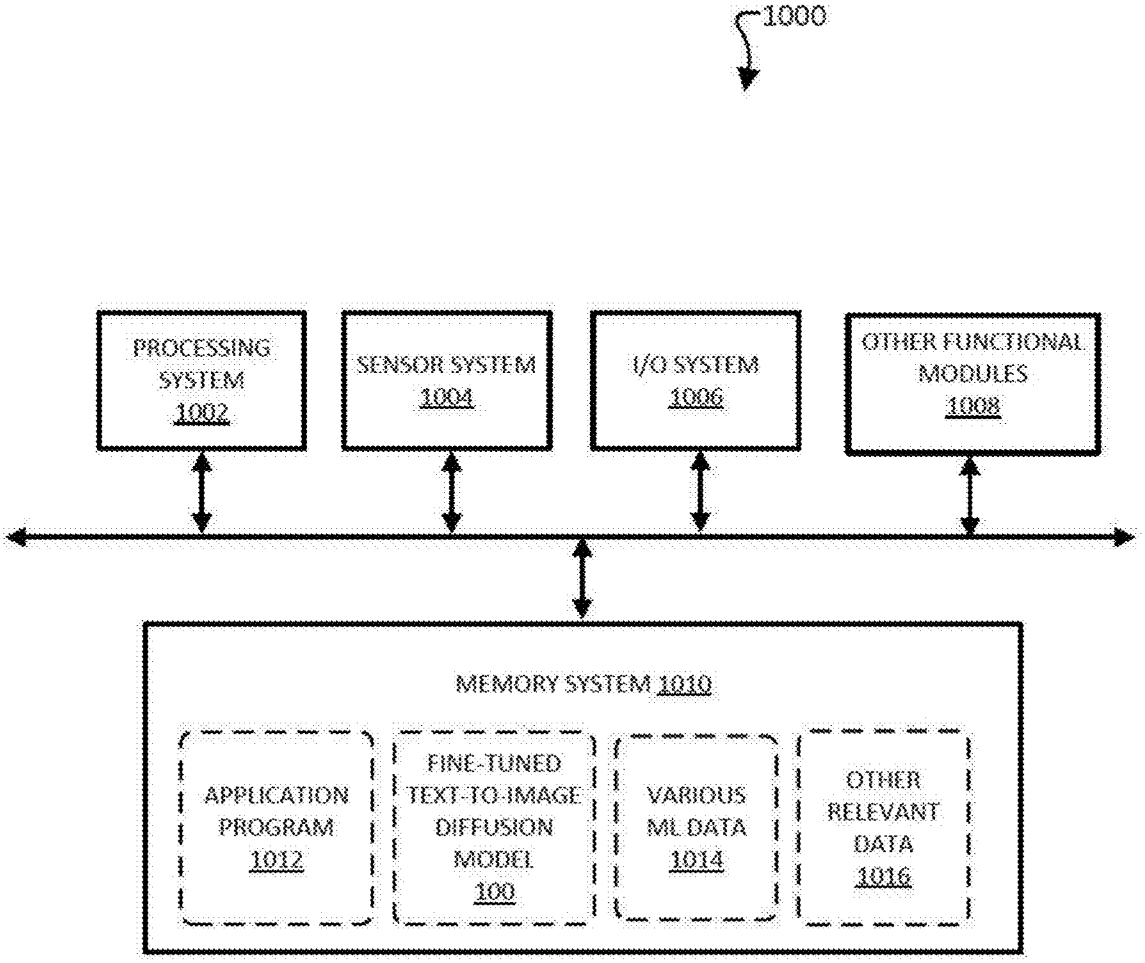
FIG. 10 illustrates an example of a system that is configured to perform the image synthesis process of FIG. 1 according to at least one example embodiment of this disclosure.

FIG. 10 is a diagram of an example of a system 1000 configured to perform the image synthesis process of FIG. 1 according to an example embodiment. The system 1000 includes at least a processing system 1002. The processing system 1002 includes one or more processing devices. For example, the processing system 1002 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 1002 is operable to provide the functionality as described herein.

The system 1000 includes at least a memory system 1010, which is operatively connected to the processing system 1002. The memory system 1010 is in data communication with the processing system 1002. In an example embodiment, the memory system 1010 includes at least one non-transitory computer readable medium, which is configured to store and provide access to various data to enable at least the processing system 1002 to perform the operations and functionality, as disclosed herein. In an example embodiment, the memory system 1010 comprises a single device or a plurality of devices. The memory system 1010 can include electrical, electronic, magnetic, optical, semiconductor, electromagnetic, or any suitable storage technology that is operable with the system 1000. For instance, in an example embodiment, the memory system 1010 can include random access memory (RAM), read only memory (ROM), flash memory, a disk drive, a memory card, an optical storage device, a magnetic storage device, a memory module, any suitable type of memory device, or any combination thereof.

In an example embodiment, the memory system 1010 includes at least the finetuned Text-to-Image Latent Diffusion Model 100, an application program 1012, various machine learning (ML) data 1014, and other relevant data 1016, which are stored thereon. In another embodiment, the memory system 1010 includes at least the finetuned Text-to-Image Diffusion Model in place of the Text-to-Image Latent Diffusion Model 100. The memory system 1010 includes computer readable data that, when executed by the processing system 1002, is configured provide the functions and processes (e.g., FIG. 1, FIG. 3, FIG. 4A-4B, FIG. 5A-5B, etc.) as described in the present disclosure. The computer readable data can include instructions, code, routines, various related data, any software technology, or any number and combination thereof. Specifically, the application program 1012 includes computer readable data with instructions, which when executed by the processing system 1002, is configured to provide an application platform for the finetuned Text-to-Image Latent Diffusion Model 100 to operate with other components of the system 1000 and interface with a user. Also, the finetuned Text-to-Image Latent Diffusion Model 100 includes computer readable data with instructions, which when executed by the processing system 1002, is configured to perform image synthesis and generate synthetic defects and/or synthetic images, as described in this disclosure. Also, the various ML data 1014 includes various training data, various loss data, various weight data and/or parameter data, as well as any related machine learning data that enables the system 1000 to perform the functions as disclosed in this disclosure. For example, the various training data includes at least the finetuning dataset for finetuning the Text-to-Image Latent Diffusion Model 100. The various training data may also include a new dataset that includes at least the synthetic images, which are generated by the finetuned Text-to-Image Latent Diffusion Model 100. The various training data may also include source images, source images, segmentation masks, complement masks, noisy images, various versions of digital images, and other data, which are used for generating the synthetic images. Meanwhile, the other relevant data 1016 provides various data (e.g. operating system, etc.), which enables the system 1000 to perform the functions as discussed herein.

In an example embodiment, as shown in FIG. 10, the system 1000 is configured to include at least one sensor system 1004. The sensor system 1004 includes one or more sensors. For example, the sensor system 1004 includes an image sensor or a camera. The sensor system 1004 may also include a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any combination thereof. The sensor system 1004 is operable to communicate with one or more other components (e.g., processing system 1002 and memory system 1010) of the system 1000. More specifically, for example, the processing system 1002 is configured to obtain the sensor data directly or indirectly from at least one sensor. The sensor system 1004 and/or the processing system 1002 is configured to generate digital images. The processing system 1002 is configured to process digital images in connection with the finetuned Text-to-Image Latent Diffusion Model 100 and the various ML data 1014.

In addition, the system 1000 includes other components that contribute to the finetuned Text-to-Image Latent Diffusion Model 100. For example, as shown in FIG. 10, the memory system 1010 is also configured to store other relevant data 1016, which relates to operation of one or more components (e.g., sensor system 1004, an input/output (I/O) system 1006, and other functional modules 1008). In addition, the I/O system 1006 includes an I/O interface and may include one or more devices (e.g., display device, keyboard device, speaker device, etc.). Also, the system 1000 includes other functional modules 1008, such as any appropriate hardware technology, software technology, or combination thereof that assist with or contribute to the functioning of the system 1000. For example, the other functional modules 1008 include communication technology that enables components of the system 1000 to communicate at least with each other, as described herein. The communication technology may enable the system 1000 to communicate with other network devices (not shown) over a communication network. With at least the configuration discussed in the example of FIG. 10, the system 1000 is configured to enable the finetuned Text-to-Image Latent Diffusion Model 100 to perform the functions as discussed in this disclosure.

Figure 11:
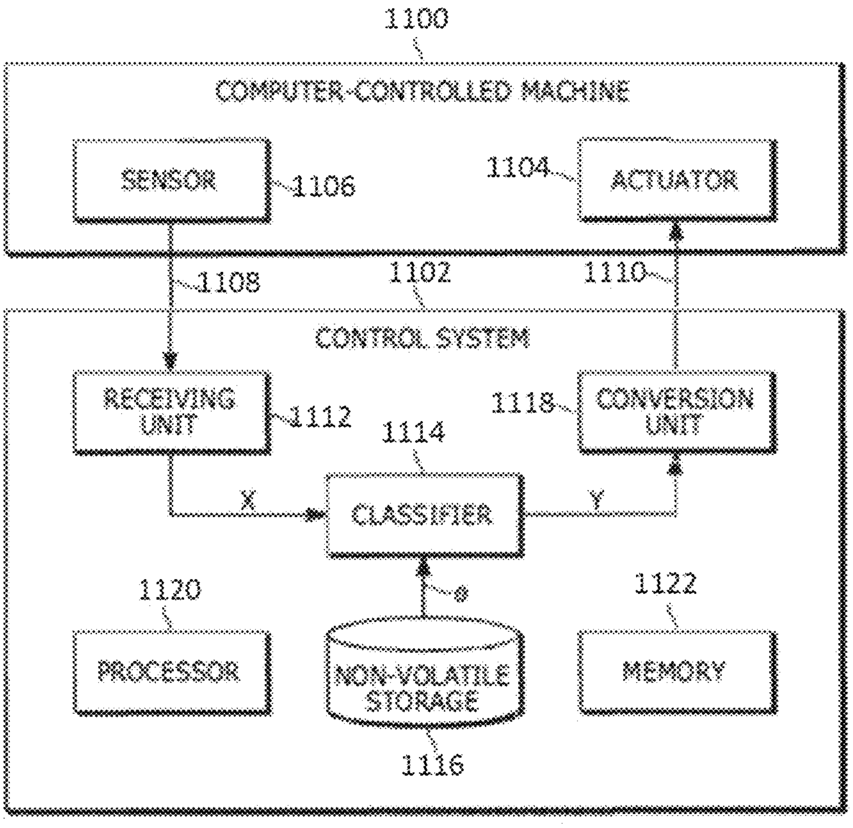
FIG. 11 illustrates a schematic diagram of an interaction between computer-controlled machine and control system according to at least one example embodiment of this disclosure.

FIG. 11 illustrates a schematic diagram of an interaction between computer-controlled machine 1100 and control system 1102 according to another example embodiment. Computer-controlled machine 1100 includes actuator 1104 and sensor 1106. Actuator 1104 may include one or more actuators and sensor 1106 may include one or more sensors. Sensor 1106 is configured to sense a condition of computer-controlled machine 1100. Sensor 1106 may be configured to encode the sensed condition into sensor signals 1108 and to transmit sensor signals 1108 to control system 1102. A non-limiting example of sensor 1106 includes video, radar, LiDAR, an ultrasonic sensor, an image sensor, an audio sensor, a motion sensor, etc. In some embodiments, sensor 1106 is an image sensor or an optical sensor configured to provide digital images of an environment proximate to computer-controlled machine 1100.

Control system 1102 is configured to receive sensor signals 1108 from computer-controlled machine 1100. As set forth below, control system 1102 may be further configured to compute actuator control commands 1110 depending on the sensor signals and to transmit actuator control commands 1110 to actuator 1104 of computer-controlled machine 1100.

As shown in FIG. 11, control system 1102 includes receiving unit 1112. Receiving unit 1112 may be configured to receive sensor signals 1108 from sensor 1106 and to transform sensor signals 1108 into input signals x. In an alternative embodiment, sensor signals 1108 are received directly as input signals x without receiving unit 1112. Each input signal x may be a portion of each sensor signal 1108. Receiving unit 1112 may be configured to process each sensor signal 1108 to product each input signal x. Input signal x may include data corresponding to a digital image recorded by sensor 1106.

Control system 1102 includes classifier 1114. In this example, the classifier 1114 is a machine learning model that is pretrained, trained, finetuned, tested, and/or validated by a dataset, which includes synthetic images that are generated by the image synthesis process of FIG. 1. The classifier 1114 may be configured to classify input signals x into one or more labels using ML algorithms. Classifier 1114 is configured to be parametrized by parameters θ. Parameters θ may be stored in and provided by non-volatile storage 1116. Classifier 1114 is configured to determine output signals y from input signals x. Each output signal y includes information that assigns one or more labels to each input signal x. Classifier 1114 may transmit output signals y to conversion unit 1118. Conversion unit 1118 is configured to covert output signals y into actuator control commands 1110. Control system 1002 is configured to transmit actuator control commands 1010 to actuator 1004, which is configured to actuate computer-controlled machine 1000 in response to actuator control commands 1110. In some embodiments, actuator 1104 is configured to actuate computer-controlled machine 1100 based directly on output signals y.

Upon receipt of actuator control commands 1110 by actuator 1104, actuator 1104 is configured to execute an action corresponding to the related actuator control command 1110. Actuator 1104 may include a control logic configured to transform actuator control commands 1110 into a second actuator control command, which is utilized to control actuator 1104. In one or more embodiments, actuator control commands 1110 may be utilized to control a display instead of or in addition to an actuator.

In some embodiments, control system 1102 includes sensor 1106 instead of or in addition to computer-controlled machine 1100 including sensor 1106. Control system 1102 may also include actuator 1104 instead of or in addition to computer-controlled machine 1100 including actuator 1104. As shown in FIG. 11, control system 1102 also includes processor 1120 and memory 1122. Processor 1120 may include one or more processors. Memory 1122 may include one or more memory devices. The classifier 1114 of one or more embodiments may be implemented by control system 1102, which includes non-volatile storage 1116, processor 1120, and memory 1122.

Non-volatile storage 1116 may include one or more persistent data storage devices such as a hard drive, optical drive, tape drive, non-volatile solid-state device, cloud storage or any other device capable of persistently storing information. Processor 1120 may include one or more devices selected from high-performance computing (HPC) systems, graphics processing units, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1122. Memory 1122 may include a single memory device or a number of memory devices including, but not limited to, RAM, ROM, volatile memory, non-volatile memory, static random access memory (SRAM), dynamic random access memory (DRAM), flash memory, cache memory, or any other device capable of storing information.

Processor 1120 is configured to read into memory 1122 and execute computer-executable instructions residing in non-volatile storage 1116 and embodying one or more ML algorithms and/or methodologies of one or more embodiments. Non-volatile storage 1116 may include one or more operating systems and applications. Non-volatile storage 1116 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 1120, the computer-executable instructions of non-volatile storage 1116 may cause control system 1102 to implement one or more of the ML algorithms and/or methodologies to employ the classifier 1114 as disclosed herein. Non-volatile storage 1116 may also include ML data (including model parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes, layers, or blocks than those illustrated consistent with one or more embodiments. Furthermore, the processes, methods, or algorithms can be embodied in whole or in part using suitable hardware components, such as ASICs, FPGAs, state machines, controllers or other hardware components or devices, or a combination of hardware, software and firmware components.

Figure 12:
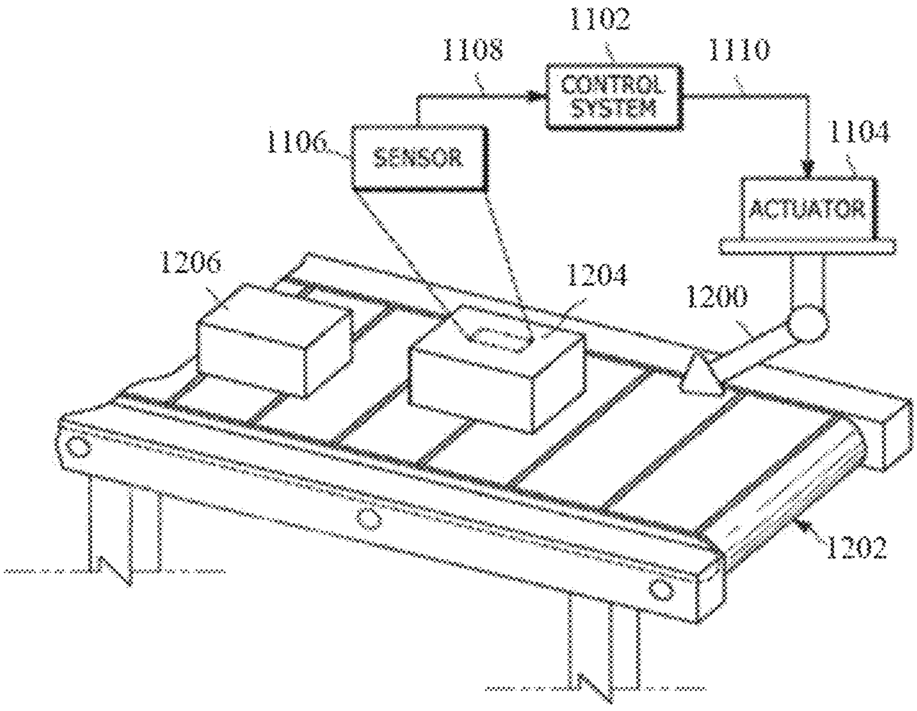
FIG. 12 illustrates a schematic diagram of control system configured to control a manufacturing machine according to at least one example embodiment of this disclosure.

FIG. 12 illustrates a schematic diagram of control system 1102 configured to control a system 1200 (e.g., manufacturing machine or a manufacturing assembly) or an AOI system. In addition, the control system 1102 is configured to control an actuator 1104, which is configured to control one or more actions associated with the system 1200.

Referring to FIG. 12, sensor 1106 includes one or more image sensors that capture digital images of objects (e.g., products or one or more portions thereof) that are at (i) a particular manufacturing stage, and/or (ii) a particular time in which these are objects are inspected for quality control purposes. Also, in this application, the classifier 1114 is configured to classify an image as being anomalous upon determining that the image includes an abnormality (e.g., defect, scratch, dent, protrusion, etc.), which is above a threshold for quality control inspection. Alternatively, the classifier 1114 is configured to classify that image as being, non-anomalous upon determining that (i) the image is normal and does not include an abnormality or (ii) the image contains an abnormality that is equal to or below the threshold for quality control inspection.

Actuator 1104 is configured to control the system 1200 (e.g., manufacturing machine) depending on the determined state (e.g., anomalous classification or non-anomalous classification) of a product 1204 or one or more portions thereof. The actuator 1104 may control functions of system 1200 (e.g., manufacturing machine) with respect to subsequent manufactured products 1206 of system 1000 (e.g., manufacturing machine) depending on the determined state of the product 1204. For example, when the control system 1102 determines, via the classifier 1114, that there is an anomaly (e.g. defect) associated with product 1204, then the control system 1102 is configured to instruct actuator 1104 to control the system 1200 such that the product 1204 is removed from the production line 1202 for further inspection. In another example, the control system 1102 is configured to halt a movement of the production line 1202 while awaiting further inspection of manufactured product 1204. In such examples, the inspection of manufactured product 1206 may be paused until the state of manufactured product 1204 is determined.

Figure 13:
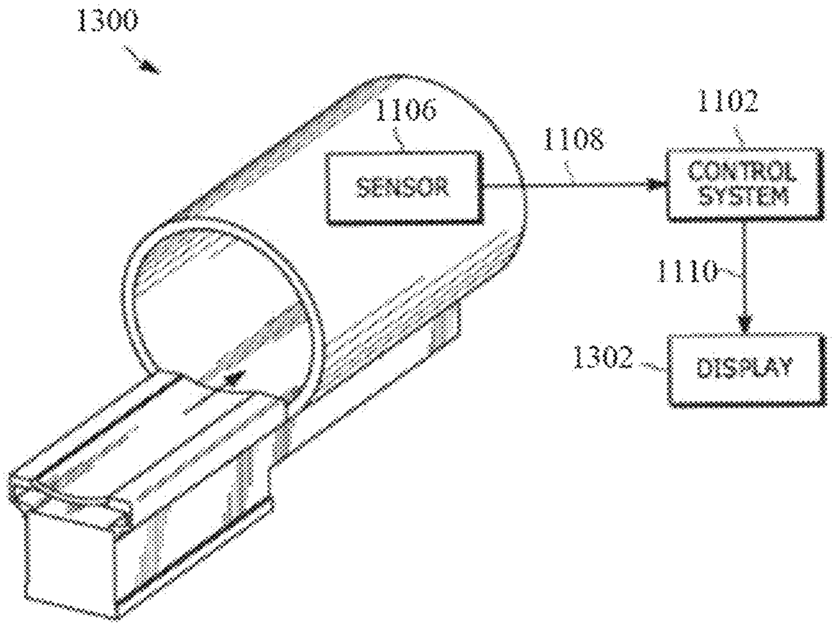
FIG. 13 is a diagram of an example of control system configured to control an imaging system according to at least one example embodiment of this disclosure.

FIG. 13 illustrates a schematic diagram of control system 1102 configured to control imaging system 1300, for example a magnetic resonance imaging (MRI) apparatus, x-ray imaging apparatus or ultrasonic apparatus. Sensor 1106 may, for example, be an imaging sensor. Classifier 1114 may be configured to determine a classification of all or part of the sensed image. As an example, in this case relating to medical imaging, the classifier 1114 is trained or finetuned on a more balanced training dataset that includes synthetic images, which include synthesized medical abnormalities that are generated by the image synthesis process of FIG. 1. Moreover, in this case, the Text-to-Image Latent Diffusion is finetuned on actual medical images with abnormalities to be specialized for this task. Also, in this case relating to medical imaging, each synthetic image displays at least a portion of a relevant body part as an object and a medical abnormality as the synthesized defect on that body part. The actuator control command 1110 is selected based on the classification obtained from the classifier 1114. For example, classifier 1114 may interpret a region of a digital image to be potentially anomalous or to have an anomalous feature (e.g., defect). In this case, the actuator control command 1110 may be selected to cause display 1302 to display the digital image and highlight the potentially anomalous region or anomalous feature (e.g., defect).

As discussed in this disclosure, the embodiments include a number of advantageous features, as well as benefits. For example, each embodiment includes a novel approach to synthesizing defects on objects of digital images by framing the task as an image editing problem. The embodiments are also advantageous in that they employ an energy function, which are based on intermediate features (e.g., ResNet feature maps) of the U-Net. Features of the diffusion model capture rich and abstract representations of different attributes in the images. These different attributes including attributes of interest, such as defects or anomalies, on objects. Specifically, this feature-level supervision offers two key advantages over pixel-level supervision: (i) the feature-level supervision allows for the seamless transfer of defect representations across different images by manipulating the learned abstract features, rather than needing precise pixel alignment, and (ii) the feature-level supervision significantly accelerates optimization of diffusion latent representations at the feature level compared to pixel-level supervision. Feature-level supervision not only improves efficiency, but also enhances the flexibility and adaptability of the defect synthesis process with respect to the image synthesis process.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method comprising:

receiving an input image that displays at least an object;

receiving (i) a source image that displays at least a defect and (ii) a corresponding segmentation mask that includes a first predetermined value for each pixel associated with an image segment of the defect and a second predetermined value for remaining pixels of the segmentation mask;

generating a target mask based on the segmentation mask and a specified modification to the defect;

generating, via a machine learning model, a source feature map based on the source image at each step of a forward diffusion process;

generating a target feature map by multiplying the target mask to a transformed version of the source feature map, the transformed version including the same specified modification, the target mask and the source feature map having a same particular spatial resolution;

generating, via the forward diffusion process involving the machine learning model, a noisy latent representation of the input image; and generating, via a reverse diffusion process involving the machine learning model, a synthetic image by denoising the noisy latent representation in the plurality of steps the plurality of steps include a current step that (i) minimizes an energy function to generate an optimized iterate of a latent representation of a current version of denoising the noisy latent representation, the energy function including a first energy component that compares differences between (a) a current masked feature map that is the target mask multiplied to a current feature map, the current feature map generated by the machine learning model based on the latent representation of the current version and (b) the target feature map of the current step (ii) predicts, via the machine learning model, a current amount of noise of the optimized iterate, and (iii) generates a latent representation of a next version using the current amount of noise and the optimized iterate, wherein the synthetic image displays the object with a new defect, the new defect being a rendition of the defect with the specified modification.

2. The computer-implemented method of claim 1, wherein the machine learning model is a finetuned Text-to-Image Latent Diffusion Model.

3. The computer-implemented method of claim 1, wherein:

the machine learning model includes a finetuned U-Net; and the source feature map is extracted from ResNet layers of the finetuned U-Net during each step of the forward diffusion process.

4. The computer-implemented method of claim 1, further comprising:

receiving a set of transformations to be applied as the specified modification to the defect, wherein the target mask is generated by applying the set of transformations to the segmentation mask.

5. The computer-implemented method of claim 1, further comprising:

generating a complement mask having the particular spatial resolution, the complement mask being a logical complement of the segmentation mask; and generating a complement feature map by multiplying the complement mask to the source feature map, wherein, the energy function is a sum of the first energy component and a second energy component, and the second energy component compares differences between (i) a complement feature map, the complement feature map being the complement mask multiplied by the current feature map and (ii) the complement feature map.

6. The computer-implemented method of claim 5, wherein the source image is used as the input image such that the synthetic image displays the source image with the new defect.

7. The computer-implemented method of claim 6, further comprising:

generating an additional target feature map by multiplying the segmentation mask to the source feature map, wherein, the energy function is a sum of the first energy component, the second energy component, and a third energy component, and the third energy component compares differences between (i) a current result, the current result being the segmentation mask multiplied by the current feature map and (ii) the additional target feature map having the same particular spatial resolution.

8. The computer-implemented method of claim 1, wherein the defect is a scratch, a dent, a discoloration, a protrusion, or an abnormal feature of the object.

9. The computer-implemented method of claim 1, wherein:

the first predetermined value of the segmentation mask is greater than zero, and the second predetermined value of the segmentation mask is zero.

10. The computer-implemented method of claim 1, wherein the energy function is minimized over a predetermined number of iterations to generate the optimized iterate.

11. A computer-implemented method comprising:

receiving an input image that displays at least an object;

receiving (i) a source image that displays at least a defect and (ii) a corresponding segmentation mask that includes a first predetermined value for each pixel associated with an image segment of the defect and a second predetermined value for remaining pixels;

generating a target mask based on the segmentation mask and a specified modification to the defect;

generating, via a machine learning model, a source feature map based on the source image at each step of a forward diffusion process;

generating a target feature map by multiplying the target mask to a transformed version of the source feature map, the transformed version including the same specified modification, the target mask and the source feature map having a same particular spatial resolution;

generating, via the forward diffusion process involving the machine learning model, a noisy input image based on the input image, the forward diffusion process including a plurality of steps; and generating, via a reverse diffusion process involving the machine learning model, a synthetic image by denoising the noisy input image in the plurality of steps, the plurality of steps include a current step that (i) minimizes an energy function to generate an optimized iterate of a current version of denoising the noisy input image, the energy function including a first energy component that compares differences between (a) a current masked feature map that is the target mask multiplied to a current feature map, the current feature map being generated by the machine learning model based on the current version and (b) the target feature map of the current step (ii) predicts, via the machine learning model, a current amount of noise of the optimized iterate, and (iii) generates a next version using the current amount of noise and the optimized iterate, wherein the synthetic image displays the object with a new defect, the new defect being a rendition of the defect with the specified modification.

12. The computer-implemented method of claim 11, wherein the machine learning model is a finetuned Text-to-Image Diffusion Model.

13. The computer-implemented method of claim 11, wherein:

the machine learning model includes a finetuned U-Net; and the source feature map is extracted from ResNet layers of the finetuned U-Net during each step of the forward diffusion process.

14. The computer-implemented method of claim 11, further comprising:

receiving a set of transformations to be applied as the specified modification to the defect, wherein the target mask is generated by applying the set of transformations to the segmentation mask.

15. The computer-implemented method of claim 11, further comprising:

generating a complement mask having the particular spatial resolution, the complement mask being a logical complement of the segmentation mask; and generating a complement feature map by multiplying the complement mask to the source feature map, wherein, the energy function is a sum of the first energy component and a second energy component, and the second energy component compares differences between (i) a complement feature map, the complement feature map being the complement mask multiplied by the current feature map and (ii) the complement feature map.

16. The computer-implemented method of claim 15, wherein the source image is used as the input image such that the synthetic image displays the source image with the new defect.

17. The computer-implemented method of claim 16, further comprising:

generating an additional target feature map by multiplying the segmentation mask to the source feature map, wherein, the energy function is a sum of the first energy component, the second energy component, and a third energy component, and the third energy component compares differences between (i) a current result, the current result being the segmentation mask multiplied by the current feature map and (ii) the additional target feature map having the same particular spatial resolution.

18. The computer-implemented method of claim 11, wherein the defect is a scratch, a dent, a discoloration, a protrusion, or an abnormal feature of the object.

19. The computer-implemented method of claim 11, wherein:

the first predetermined value of the segmentation mask is greater than zero, and the second predetermined value of the segmentation mask is zero.

20. The computer-implemented method of claim 11, wherein the energy function is minimized over a predetermined number of iterations to generate the optimized iterate.

* * * * *